US010264651B2

(12) United States Patent
Steiner

(10) Patent No.: US 10,264,651 B2
(45) Date of Patent: Apr. 16, 2019

(54) LOAD CONTROL SYSTEM HAVING A VISIBLE LIGHT SENSOR

(71) Applicant: LUTRON ELECTRONICS CO., INC., Coopersburg, PA (US)

(72) Inventor: James P. Steiner, Royersford, PA (US)

(73) Assignee: LUTRON ELECTRONICS CO., INC., Coopersburg, PA (US)

(*) Notice: Subject to any disclaimer, the term of this patent is extended or adjusted under 35 U.S.C. 154(b) by 0 days.

(21) Appl. No.: 15/374,928

(22) Filed: Dec. 9, 2016

(65) Prior Publication Data

US 2017/0171941 A1   Jun. 15, 2017

Related U.S. Application Data

(60) Provisional application No. 62/266,370, filed on Dec. 11, 2015.

(51) Int. Cl.
*H05B 37/02* (2006.01)
*H04N 7/18* (2006.01)
(Continued)

(52) U.S. Cl.
CPC ....... *H05B 37/0218* (2013.01); *G05B 19/048* (2013.01); *G06K 9/00335* (2013.01);
(Continued)

(58) Field of Classification Search
CPC .............. F21V 23/0442; G05B 19/048; G05B 2219/23153; G06K 2009/4666;
(Continued)

(56) References Cited

U.S. PATENT DOCUMENTS

| 5,248,919 A | 9/1993 | Hanna et al. |
| 7,391,297 B2 | 6/2008 | Cash et al. |

(Continued)

FOREIGN PATENT DOCUMENTS

| JP | 2002-289377 A | 10/2002 |
| WO | WO 2001/099474 A1 | 12/2001 |
| WO | WO 2015/039035 A1 | 3/2015 |

*Primary Examiner* — Tung X Le
*Assistant Examiner* — Henry Luong
(74) *Attorney, Agent, or Firm* — Condo Roccia Koptiw LLP

(57) ABSTRACT

A sensor for sensing environmental characteristics of a space may include a visible light sensing circuit for recording an image of the space and a control circuit responsive to the visible light sensing circuit. The control circuit may detect an occupancy or vacancy condition in the space in response to the visible light sensing circuit, and measure a light level in the space in response to the visible light sensing circuit. The control circuit may also include a low-energy occupancy sensing circuit for detecting an occupancy condition in the space. The control circuit may disable the visible light sensing circuit when the space is vacant. The control circuit may detect an occupancy condition in the space in response to the low-energy occupancy sensing circuit and subsequently enable the visible light sensing circuit. The visible light sensor may be configured in a way that protects the privacy of the occupants of the space.

13 Claims, 18 Drawing Sheets

(51) Int. Cl.
*G05B 19/048* (2006.01)
*G06K 9/00* (2006.01)
*G06K 9/46* (2006.01)
*H04N 5/232* (2006.01)

(52) U.S. Cl.
CPC ......... *G06K 9/4652* (2013.01); *G06K 9/4671* (2013.01); *H04N 5/232* (2013.01); *H04N 5/23212* (2013.01); *H04N 7/188* (2013.01); *H05B 37/0227* (2013.01); *H05B 37/0254* (2013.01); *H05B 37/0272* (2013.01); *G05B 2219/23153* (2013.01); *G06K 2009/4666* (2013.01)

(58) Field of Classification Search
CPC ............. G06K 9/00335; G06K 9/4652; G06K 9/4671; H04N 5/232; H04N 5/23212; H04N 7/188; H05B 37/0218; H05B 37/0227; H05B 37/0254; H05B 37/0272
See application file for complete search history.

(56) References Cited

U.S. PATENT DOCUMENTS

| | | | |
|---|---|---|---|
| 7,643,908 B2 | 1/2010 | Quirino et al. | |
| 7,940,167 B2 | 5/2011 | Steiner et al. | |
| 8,009,042 B2 | 8/2011 | Steiner et al. | |
| 8,184,004 B2 | 5/2012 | Roosli | |
| 8,199,010 B2 | 6/2012 | Sloan et al. | |
| 8,228,184 B2 | 7/2012 | Blakeley et al. | |
| 8,288,981 B2 | 10/2012 | Zaharchuk et al. | |
| 8,410,706 B2 | 4/2013 | Steiner et al. | |
| 8,451,116 B2 | 5/2013 | Steiner et al. | |
| 8,610,570 B2 | 12/2013 | Roosli | |
| 8,760,293 B2 | 6/2014 | Steiner | |
| 8,950,461 B2 | 2/2015 | Adams et al. | |
| 8,965,107 B1 | 2/2015 | Schpok et al. | |
| 9,084,310 B2 | 7/2015 | Bedell et al. | |
| 9,148,937 B2 | 9/2015 | Steiner et al. | |
| 9,232,610 B2 | 1/2016 | Gritti | |
| 9,277,629 B2 | 3/2016 | Steiner et al. | |
| 9,295,112 B2 | 3/2016 | Knapp | |
| 9,425,978 B2 | 8/2016 | Frei et al. | |
| 9,746,371 B1 | 8/2017 | Kumar | |
| 9,756,710 B2 | 9/2017 | Ghanoun et al. | |
| 9,826,598 B2 | 11/2017 | Roberts et al. | |
| 9,878,447 B2 | 1/2018 | Thibodeau et al. | |
| 2004/0160199 A1 | 8/2004 | Morgan et al. | |
| 2008/0092075 A1 | 4/2008 | Jacob et al. | |
| 2009/0206983 A1 | 8/2009 | Knode et al. | |
| 2011/0071675 A1 | 3/2011 | Wells et al. | |
| 2012/0153840 A1 | 6/2012 | Dahlen et al. | |
| 2012/0319596 A1 | 12/2012 | Nanahara et al. | |
| 2013/0026947 A1 | 1/2013 | Economy et al. | |
| 2013/0030589 A1 | 1/2013 | Pessina et al. | |
| 2013/0088154 A1 | 4/2013 | Van et al. | |
| 2014/0015417 A1 | 1/2014 | Iwai et al. | |
| 2014/0071677 A1 | 3/2014 | Pickard et al. | |
| 2014/0132475 A1 | 5/2014 | Bhutani et al. | |
| 2014/0156079 A1 | 6/2014 | Courtney et al. | |
| 2014/0191665 A1 | 7/2014 | Gommans et al. | |
| 2014/0265568 A1 | 9/2014 | Crafts et al. | |
| 2014/0265863 A1 | 9/2014 | Gajurel et al. | |
| 2014/0267008 A1 | 9/2014 | Jain et al. | |
| 2014/0305602 A1 | 10/2014 | Kirby et al. | |
| 2014/0312777 A1 | 10/2014 | Shearer et al. | |
| 2015/0076992 A1* | 3/2015 | Walma | H05B 37/0218 315/153 |
| 2015/0222861 A1 | 8/2015 | Fujii et al. | |
| 2015/0279051 A1 | 10/2015 | Kovesi et al. | |
| 2015/0368967 A1 | 12/2015 | Lundy et al. | |
| 2016/0027262 A1 | 1/2016 | Skotty et al. | |
| 2016/0047164 A1 | 2/2016 | Lundy et al. | |
| 2016/0054023 A1 | 2/2016 | Baker et al. | |
| 2016/0056629 A1 | 2/2016 | Baker et al. | |
| 2016/0150617 A1 | 5/2016 | Montagne | |
| 2016/0191864 A1 | 6/2016 | Siminoff et al. | |
| 2016/0224036 A1 | 8/2016 | Baker et al. | |
| 2016/0249439 A1* | 8/2016 | Recker | H02J 9/02 |
| 2016/0278188 A1 | 9/2016 | Karc et al. | |
| 2016/0353549 A1 | 12/2016 | Walma, Jr. | |
| 2016/0374176 A1 | 12/2016 | Van Der Poel | |
| 2017/0038787 A1 | 2/2017 | Baker et al. | |
| 2017/0048950 A1 | 2/2017 | Deese et al. | |
| 2017/0171941 A1 | 6/2017 | Steiner | |
| 2017/0223802 A1 | 8/2017 | Vacha et al. | |
| 2017/0353699 A1 | 12/2017 | Wang | |
| 2018/0063485 A1* | 3/2018 | Sannala | H01Q 21/28 |

\* cited by examiner

LOAD CONTROL SYSTEM HAVING A VISIBLE LIGHT SENSOR

CROSS-REFERENCE TO RELATED APPLICATIONS

This application claims the benefit of U.S. Provisional Patent Application No. 62/266,370, filed Dec. 11, 2015, the entire disclosure of which is incorporated by reference herein.

BACKGROUND

A user environment, such as a residence or an office building, for example, may be configured using various types of load control systems. A lighting control system may be used to control the lighting loads providing artificial light in the user environment. A motorized window treatment control system may be used to control the natural light provided to the user environment. An HVAC system may be used to control the temperature in the user environment.

Each load control system may include various control devices, including input devices and load control devices. The load control devices may receive digital messages, which may include load control instructions, for controlling an electrical load from one or more of the input devices. The load control devices may be capable of directly controlling an electrical load. The input devices may be capable of indirectly controlling the electrical load via the load control device.

Examples of load control devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, glare sensors, color temperature sensors, temperature sensors, and/or the like. Remote control devices may receive user input for performing load control. Occupancy sensors may include infrared (IR) sensors for detecting occupancy/vacancy of a space based on movement of the users. Daylight sensors may detect a daylight level received within a space. Glare sensors may be positioned facing outside of a building (e.g., on a window or exterior of a building) to identify the position of the sun when in view of the glare sensor. Color temperature sensor determines the color temperature within a user environment based on the wavelengths and/or frequencies of light. Temperature sensors may detect the current temperature of the space.

As described herein, current load control systems implement many input devices, including a number of different sensors. The use of many input devices causes the load control systems to take readings from multiple different types of devices and control loads based on many different types of input. Additionally, many of these devices communicate wirelessly over the same wireless communication network, which may create congestion on the network due to the number of devices that may be communicating at the same time.

The input devices in current load control systems may also be inefficient for performing their independent functions in the load control systems. For example, current load control systems may receive input from a glare sensor that indicates that glare is being received from the sun, but load control systems may attempt to reduce or eliminate the amount of glare within the user environment using prediction algorithms to predict the portions of the user environment that are being affected by glare. Attempting to reduce or eliminate the amount of glare within the user environment using these prediction algorithms may be unreliable.

The daylight sensors and the color temperature sensors in the load control systems may also be inefficient for gathering accurate information for performing load control. Current use of daylight sensors and color temperature sensors rely on the accuracy of the location of the sensor for detecting how the intensity of light affects the user environment. It may be desirable to have more accurate ways of determining how the actual intensity and color of light provided within the user environment affects a user within the environment.

As the occupancy/vacancy sensor generally senses the presence or absence of a person within the user environment using passive infra-red (PIR) technology, the occupancy/vacancy sensor may fail to detect the occupancy of a room due to the lack of movement by a user. The occupancy/vacancy sensor senses the presence of a person using the heat movement of the person. The vacancy sensor determines a vacancy condition within the user environment in the absence of the heat movement of a person for a specified timeout period. The occupancy/vacancy sensor may detect the presence or absence of a user within the user environment, but the sensor may fail to provide accurate results. For example, the occupancy/vacancy sensor may detect other heat sources within a user environment and inaccurately determine that the heat sources are emanating from a person. Further, the occupancy/vacancy sensor is unable to identify a person that is not moving, or that is making minor movements, within the user environment. Thus, it may be desirable to otherwise determine occupancy/vacancy within a user environment.

As complex load control systems generally include many different types of input devices for gathering information about a load control environment, the processing and communicating of information in such systems can be inefficient. Additionally, as the information collected by many input devices may be inaccurate, the control of loads according to such information may also be inaccurate.

SUMMARY

The present disclosure relates to a load control system for controlling the amount of power delivered to one or more electrical load, and more particularly, to a load control system having a visible light sensor for detecting occupancy and/or vacancy conditions in a space.

As described herein, a sensor for sensing environmental characteristics of a space comprises a visible light sensing circuit configured to record an image of the space and a control circuit responsive to the visible light sensing circuit. The control circuit may be configured to detect at least one of an occupancy condition and a vacancy condition in the space in response to the visible light sensing circuit, and to measure a light level in the space in response to the visible light sensing circuit.

The visible light sensor may perform differently depending on the mode in which the visible light sensor is operating. For example, the visible light sensor may detect and/or adjust an environmental characteristic within a space based on the mode in which the visible light sensor is operating. The visible light sensor may operate in a particular mode for a period of time and/or the visible light sensor may switch from one mode to another mode after the same, or different, period of time. The modes in which the visible light sensor may operate may include a sunlight glare mode, a daylighting mode, a color temperature mode, an occupancy/vacancy mode, etc.

The control circuit may be configured to sense a first environmental characteristic of the space by applying a first mask to focus on a first region of interest of the image, and to sense a second environmental characteristic of the space by applying a second mask to focus on a second region of interest of the image. The control circuit may be configured to apply the first mask to focus on the first region of interest of the image in order to detect at least one of an occupancy condition and a vacancy condition in the space. The control circuit may be configured to apply the second mask to focus on the second region of interest of the image in order to measure a light level in the space.

The control circuit may be configured to perform a number of sequential sensor events for sensing a plurality of environmental characteristics in response to the image. Each sensor event may be characterized by one of the plurality of environmental characteristics to detect during the sensor event and a respective mask. The control circuit may be configured to perform one of the sensor events to sense the respective environmental characteristic by applying the respective mask to the image to focus on a region of interest and process the portion of the image in the region of interested using to a predetermined algorithm for sensing the respective environmental characteristic.

The control circuit may further comprise a low-energy occupancy sensing circuit configured to detect an occupancy condition in the space. The control circuit may be configured to disable the visible light sensing circuit when the space is vacant. The control circuit may be configured to detect an occupancy condition in the space in response to the low-energy occupancy sensing circuit and to subsequently enable the visible light sensing circuit. The control circuit may be configured to detect that a vacancy condition in the space in response to the visible light sensor.

Methods of configuring a visible light sensor mounted in a space are also described herein. The visible light sensor may be configured in a way that protects the privacy of the occupants of the space. The visible light sensor may be installed at a location at which the visible light sensor can record an image of the space. The visible light sensor configured to transmit and receive digital message via a first communication link during normal operation.

A first method of configuring a visible light sensor may comprise: (1) recording an image of the space by the visible light sensor; (2) executing a configuration software on the visible light sensor to transmit a digital representation of the image to a network device via a second communication link; (3) setting at least one configuration parameter of the visible light sensor at the network device using the digital representation of the image; (4) transmitting the at least one configuration parameter to the visible light sensor; and (5) subsequently installing normal operation software in place of the configuration software, wherein the visible light sensor is not able to transmit digital messages via the second communication link while executing the normal operation software during normal operation.

A second method of configuring a visible light sensor may comprise: (1) installing a configuration module in the visible light sensor, the configuration module enabling the visible light sensor to transmit and receive digital messages via a second communication link; (2) recording an image of the space by the visible light sensor; (3) transmitting a digital representation of the image from the visible light sensor to a network device via the second communication link while the configuration module in installed in the visible light sensor; (4) setting at least one configuration parameter of the visible light sensor at the network device using the digital representation of the image; (5) transmitting the at least one configuration parameter to the visible light sensor; and (6) uninstalling the configuration module from the visible light sensor to prevent the visible light sensor from subsequently transmitting digital messages via the second communication link during normal operation.

A third method of configuring a visible light sensor may comprise: (1) installing a configuration sensor at the location at which the visible light sensor is to be installed; (2) recording an image of the space by the configuration sensor; (3) transmit a digital representation of the image from the configuration sensor to a network device via a second communication link; (4) setting at least one configuration parameter of the visible light sensor at the network device using the digital representation of the image; (5) uninstalling the configuration sensor; (6) installing the visible light sensor at the location at which the visible light sensor can record an image of the space; and (7) transmitting the at least one configuration parameter to the visible light sensor.

DETAILED DESCRIPTION

Figure 1:
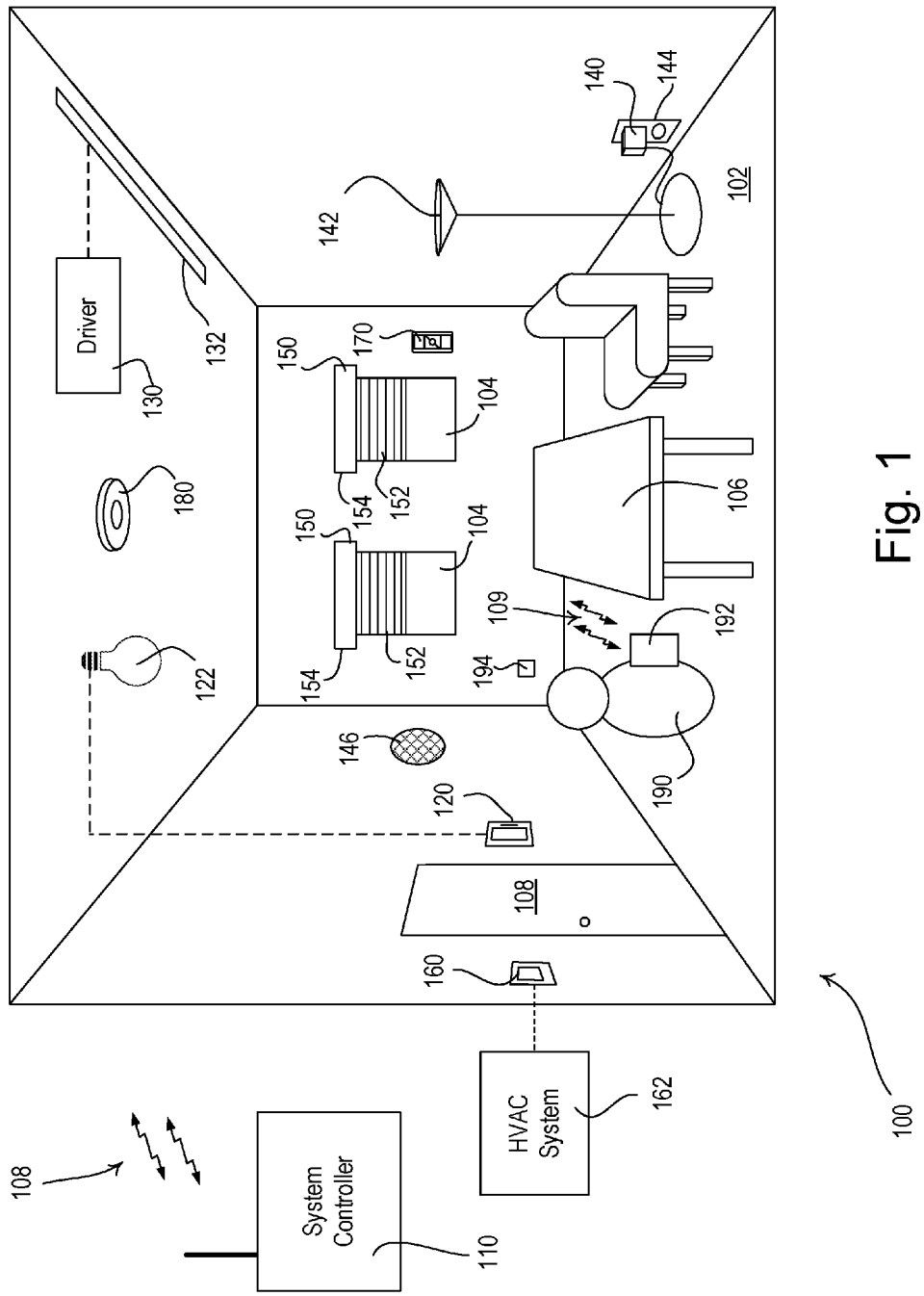
FIG. 1 is a simple diagram of an example load control system having a visible light sensor.

FIG. 1 is a simple diagram of an example load control system 100 for controlling the amount of power delivered from an alternating-current (AC) power source (not shown) to one or more electrical loads. The load control system 100 may be installed in a room 102 of a building. The load control system 100 may comprise a plurality of control devices configured to communicate with each other via wireless signals, e.g., radio-frequency (RF) signals 108. Alternatively or additionally, the load control system 100 may comprise a wired digital communication link coupled to one or more of the control devices to provide for communication between the load control devices. The control devices of the load control system 100 may comprise a number of control-source devices (e.g., input devices operable to transmit digital messages in response to user inputs, occupancy/vacancy conditions, changes in measured light intensity, etc.) and a number of control-target devices (e.g., load control devices operable to receive digital messages and control respective electrical loads in response to the received digital messages). A single control device of the load control system 100 may operate as both a control-source and a control-target device.

The control-source devices may be configured to transmit digital messages directly to the control-target devices. In addition, the load control system 100 may comprise a system controller 110 (e.g., a central processor or load controller) operable to communicate digital messages to and from the control devices (e.g., the control-source devices and/or the control-target devices). For example, the system controller 110 may be configured to receive digital messages from the control-source devices and transmit digital messages to the control-target devices in response to the digital messages received from the control-source devices. The control-source and control-target devices and the system controller 110 may be configured to transmit and receive the RF signals 108 using a proprietary RF protocol, such as the ClearConnect® protocol. Alternatively, the RF signals 108 may be transmitted using a different RF protocol, such as, a standard protocol, for example, one of WIFI, ZIGBEE, Z-WAVE, KNX-RF, ENOCEAN RADIO protocols, or a different proprietary protocol.

The load control system 100 may comprise one or more load control devices, e.g., a dimmer switch 120 for controlling a lighting load 122. The dimmer switch 120 may be adapted to be wall-mounted in a standard electrical wallbox. The dimmer switch 120 may comprise a tabletop or plug-in load control device. The dimmer switch 120 may comprise a toggle actuator (e.g., a button) and an intensity adjustment actuator (e.g., a rocker switch). Actuations (e.g., successive actuations) of the toggle actuator may toggle (e.g., turn off and on) the lighting load 122. Actuations of an upper portion or a lower portion of the intensity adjustment actuator may respectively increase or decrease the amount of power delivered to the lighting load 122 and thus increase or decrease the intensity of the receptive lighting load from a minimum intensity (e.g., approximately 1%) to a maximum intensity (e.g., approximately 100%). The dimmer switch 120 may comprise a plurality of visual indicators, e.g., light-emitting diodes (LEDs), which may be arranged in a linear array and are illuminated to provide feedback of the intensity of the lighting load 122. Examples of wall-mounted dimmer switches are described in greater detail in U.S. Pat. No. 5,248,919, issued Sep. 29, 1993, entitled LIGHTING CONTROL DEVICE, and U.S. Patent Application Publication No. 2014/0132475, published May 15, 2014, entitled WIRELESS LOAD CONTROL DEVICE, the entire disclosures of which are hereby incorporated by reference.

The dimmer switch 120 may be configured to wirelessly receive digital messages via the RF signals 108 (e.g., from the system controller 110) and to control the lighting load 122 in response to the received digital messages. Examples of dimmer switches operable to transmit and receive digital messages is described in greater detail in commonly-assigned U.S. patent application Ser. No. 12/033,223, filed Feb. 19, 2008, entitled COMMUNICATION PROTOCOL FOR A RADIO-FREQUENCY LOAD CONTROL SYSTEM, the entire disclosure of which is hereby incorporated by reference.

The load control system 100 may comprise one or more remotely-located load control devices, such as a light-emitting diode (LED) driver 130 for driving an LED light source 132 (e.g., an LED light engine). The LED driver 130 may be located remotely, for example, in or adjacent to the lighting fixture of the LED light source 132. The LED driver 130 may be configured to receive digital messages via the RF signals 108 (e.g., from the system controller 110) and to control the LED light source 132 in response to the received digital messages. The LED driver 130 may be configured to adjust the color temperature of the LED light source 132 in response to the received digital messages. Examples of LED drivers configured to control the color temperature of LED light sources are described in greater detail in commonly-assigned U.S. Patent Application Publication No. 2014/0312777, filed Oct. 23, 2014, entitled SYSTEMS AND METHODS FOR CONTROLLING COLOR TEMPERATURE, the entire disclosure of which is hereby incorporated by reference. The load control system 100 may further comprise other types of remotely-located load control devices, such as, for example, electronic dimming ballasts for driving fluorescent lamps.

The load control system 100 may comprise a plug-in load control device 140 for controlling a plug-in electrical load, e.g., a plug-in lighting load (such as a floor lamp 142 or a table lamp) and/or an appliance (such as a television or a computer monitor). For example, the floor lamp 142 may be plugged into the plug-in load control device 140. The plug-in load control device 140 may be plugged into a standard electrical outlet 144 and thus may be coupled in series between the AC power source and the plug-in lighting load. The plug-in load control device 140 may be configured to receive digital messages via the RF signals 108 (e.g., from the system controller 110) and to turn on and off or adjust the intensity of the floor lamp 142 in response to the received digital messages.

Alternatively or additionally, the load control system 100 may comprise controllable receptacles for controlling plug-in electrical loads plugged into the receptacles. The load control system 100 may comprise one or more load control devices or appliances that are able to directly receive the wireless signals 108 from the system controller 110, such as a speaker 146 (e.g., part of an audio/visual or intercom system), which is able to generate audible sounds, such as alarms, music, intercom functionality, etc.

The load control system 100 may comprise one or more daylight control devices, e.g., motorized window treatments 150, such as motorized cellular shades, for controlling the amount of daylight entering the room 102. Each motorized window treatments 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the room 102. The motor drive units of the motorized window treatments 150 may be configured to receive digital messages via the RF signals 108 (e.g., from the system controller 110) and adjust the position of the respective window treatment fabric 152 in response to the received digital messages. The load control system 100 may comprise other types of daylight control devices, such as, for example, a cellular shade, a drapery, a Roman shade, a Venetian blind, a Persian blind, a pleated blind, a tensioned roller shade systems, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Patent Application Publication No. 2014/0305602, published Oct. 16, 2014, entitled INTEGRATED ACCESSIBLE BATTERY COMPARTMENT FOR MOTORIZED WINDOW TREATMENT, the entire disclosures of which are hereby incorporated by reference.

The load control system 100 may comprise one or more temperature control devices, e.g., a thermostat 160 for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate digital messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. The HVAC system 162 may be configure to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102. The thermostat 160 may be configured to receive digital messages via the RF signals 108 (e.g., from the system controller 110) and adjust heating, ventilation, and cooling in response to the received digital messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., such as a remote control device 170 and a visible light sensor 180. The input devices may be fixed or movable input devices. The system controller 110 may be configured to transmit one or more digital messages to the load control devices (e.g., the dimmer switch 120, the LED driver 130, the plug-in load control device 140, the motorized window treatments 150, and/or the thermostat 160) in response to the digital messages received from the remote control device 170 and the visible light sensor 180. The remote control device 170 and the visible light sensor 180 may be configured to transmit digital messages directly to the dimmer switch 120, the LED driver 130, the plug-in load control device 140, the motorized window treatments 150, and the temperature control device 160.

The remote control device 170 may be configured to transmit digital messages via the RF signals 108 to the system controller 110 (e.g., directly to the system controller) in response to an actuation of one or more buttons of the remote control device. For example, the remote control device 170 may be battery-powered. The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link). The system controller 110 may be configured to communicate via the network with one or more network devices, e.g., a mobile device 190, such as, a personal computing device and/or a wearable wireless device. The mobile device 190 may be located on an occupant 192, for example, may be attached to the occupant's body or clothing or may be held by the occupant. The mobile device 190 may be characterized by a unique identifier (e.g., a serial number or address stored in memory) that uniquely identifies the mobile device 190 and thus the occupant 192. Examples of personal computing devices may include a smart phone (for example, an iPhone® smart phone, an Android® smart phone, or a Blackberry® smart phone), a laptop, and/or a tablet device (for example, an iPad® hand-held computing device). Examples of wearable wireless devices may include an activity tracking device (such as a FitBit® device, a Misfit® device, and/or a Sony Smartband® device), a smart watch, smart clothing (e.g., OMsignal® smartwear, etc.), and/or smart glasses (such as Google Glass® eyewear). In addition, the system controller 110 may be configured to communicate via the network with one or more other control systems (e.g., a building management system, a security system, etc.).

The mobile device 190 may be configured to transmit digital messages to the system controller 110, for example, in one or more Internet Protocol packets. For example, the mobile device 190 may be configured to transmit digital messages to the system controller 110 over the LAN and/or via the internet. The mobile device 190 may be configured to transmit digital messages over the internet to an external service (e.g., If This Then That (IFTTT®) service), and then the digital messages may be received by the system controller 110. The mobile device 190 may transmit and receive RF signals 109 via a Wi-Fi communication link, a Wi-MAX communications link, a Bluetooth communications link, a near field communication (NFC) link, a cellular communications link, a television white space (TVWS) communication link, or any combination thereof. Alternatively or additionally, the mobile device 190 may be configured to transmit RF signals according to the proprietary protocol. The load control system 100 may comprise other types of network devices coupled to the network, such as a desktop personal computer, a Wi-Fi or wireless-communication-capable television, or any other suitable Internet-Protocol-enabled device. Examples of load control systems operable to communicate with mobile and/or network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The system controller 110 may be configured to determine the location of the mobile device 190 and/or the occupant 192. The system controller 110 may be configured to control (e.g., automatically control) the load control devices (e.g., the dimmer switch 120, the LED driver 130, the plug-in load control device 140, the motorized window treatments 150, and/or the temperature control device 160) in response to determining the location of the mobile device 190 and/or the occupant 192. One or more of the control devices of the load control system 100 may transmit beacon signals, for example, RF beacon signals transmitted using a short-range and/or low-power RF technology, such as Bluetooth technology. The load control system 100 may also comprise at least one beacon transmitting device 194 for transmitting the beacon signals. The mobile device 190 may be configured to receive a beacon signal when located near a control device that is presently transmitting the beacon signal. A beacon signal may comprise a unique identifier identifying the location of the load control device that transmitted the beacon signal. Since the beacon signal may be transmitted using a short-range and/or low-power technology, the unique identifier may indicate the approximate location of the mobile device 190. The mobile device 190 may be configured to transmit the unique identifier to the system controller 110, which may be configured to determine the location of the mobile device 190 using the unique identifier (e.g., using data stored in memory or retrieved via the Internet). An example of a load control system for controlling one or more electrical loads in response to the position of a mobile device and/or occupant inside of a building is described in greater detail in commonly-assigned U.S. patent application Ser. No. 14/832,798, filed Aug. 21, 2015, entitled LOAD CONTROL SYSTEM RESPONSIVE TO LOCATION OF AN OCCUPANT AND MOBILE DEVICES, the entire disclosure of which is hereby incorporated by reference.

The visible light sensor 180 may comprise a camera directed into the room 102 and may be configured to record images of the room 102. For example, the visible light sensor 180 may be mounted to a ceiling of the room 102 (as shown in FIG. 1), and/or may be mounted to a wall of the room. The visible light sensor 180 may comprise a fish-eye lens. If the visible light sensor 180 is mounted to the ceiling, the images recorded by the camera may be top down views of the room 102.

Figure 2A:
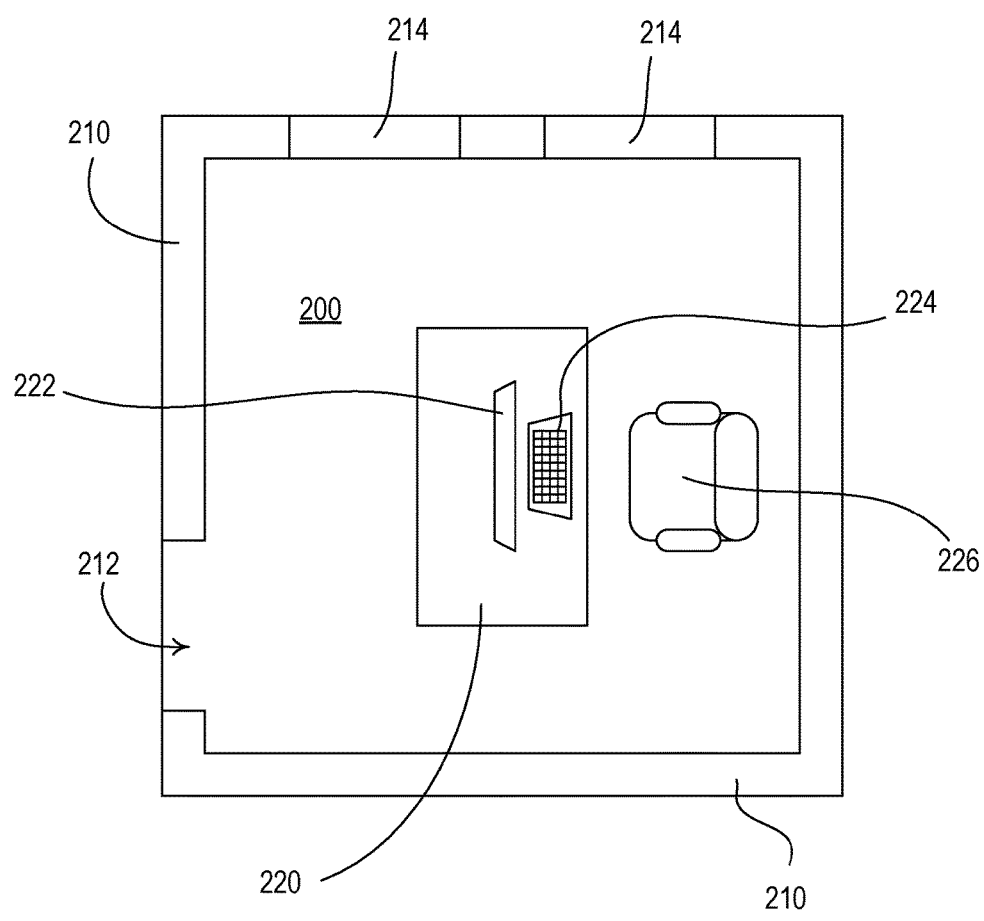
FIGS. 2A-2G show simplified example images of a room that may be recorded by a camera of a visible light sensor.

FIGS. 2A-2G show simplified example images of a room 200 that may be recorded by the camera of the visible light sensor. As shown in FIG. 2A, the room 200 may comprise walls 210 having a doorway 212 and windows 214. The room 200 may include a desk 220 on which a computer monitor 222 and a keyboard 224 may be located. The room 200 may also include a chair 226 on which an occupant of the room 200 may typically be positioned to use the computer monitor 222 and the keypad 224. The example images of the room 200 shown in FIGS. 2A-2G are provided for informative purposes and may not be identical to actual images captured by the visible light sensor 180. Since the visible light sensor 180 may have a fish-eye lens, the actual images captured by the camera may warped images and may not be actual two-dimensional images as shown in FIGS. 2A-2G. In addition, the example image of the room 200 shown in FIGS. 2A-2G show the walls 210 having thickness and actual images captured by the visible light sensor 180 may only show the interior surfaces of the room 102.

The visible light sensor 180 may be configured to process images recorded by the camera and transmit one or more messages (e.g., digital messages) to the load control devices in response to the processed images. The visible light sensor 180 may be configured to sense one or more environmental characteristics of a space (e.g., the room 102 and/or the room 200) from the images. For example, the visible light sensor 180 may be configured to operate in one or more sensor modes (e.g., an occupancy and/or vacancy sensor mode, a daylight sensor mode, a color sensor mode, a glare detection sensor mode, an occupant count mode, etc.) The visible light sensor 180 may execute different algorithms to process the images in each of the sensor modes to determine data to transmit to the load control devices. The visible light sensor 180 may transmit digital messages via the RF signals 108 (e.g., using the proprietary protocol) in response to the images. The visible light sensor 180 may send the digital messages directly to the load control devices and/or to the system controller 110 which may then communicate the messages to the load control devices. The visible light sensor 180 may comprise a first communication circuit for transmitting and receiving the RF signals 108 using the proprietary protocol.

The visible light sensor 180 may be configured to perform a plurality of sensor events to sense various environmental characteristics of the space. For example, to perform a sensor event, the visible light sensor 180 may be configured to operate in one of sensor modes to execute the appropriate algorithm to sense the environmental characteristic. In addition, the visible light sensor 180 may configured to obtain from memory certain pre-configured operational characteristics (e.g., sensitivity, baseline values, threshold values, limit values, etc.) that may be used by the algorithm to sense the environmental characteristic during the sensor event. Further, the visible light sensor 180 may be configured to focus on one or more regions of interest in the image recorded by the camera when processing the image to sense the environmental characteristic during the sensor event. For example, certain areas of the image recorded by the camera may be masked (e.g., digitally masked), such that the visible light sensor 180 may not process the portions of the image in the masked areas. The visible light sensor 180 may be configured to apply a mask (e.g., a predetermined digital mask that may be stored in memory) to focus on a specific region of interest, and process the portion of the image in the region of interest. In addition, the visible light sensor 180 may be configured to focus on multiple regions of interest in the image at the same time (e.g., as shown in FIGS. 2B-2G). Specific mask(s) may be defined for each sensor event.

The visible light sensor 180 may be configured to dynamically change between the sensor modes, apply digital masks to the images, and adjust operational characteristics depending upon the present sensor event. The visible light sensor 180 may be configured to perform a number of different sensor events to sense a plurality of the environmental characteristics of the space. For example, the visible light sensor 180 may be configured to sequentially and/or periodically step through the sensor events to sense the plurality of the environmental characteristics of the space. Each sensor events may be characterized by a sensor mode (e.g., specifying an algorithm to use), one or more operational characteristics, and one or more digital masks.

The visible light sensor 180 may be configured to operate in the occupancy and/or vacancy sensor mode to determine an occupancy and/or vacancy condition in the space in response to detection of movement within one or more regions of interest. The visible light sensor 180 may be configured to use an occupancy and/or vacancy detection algorithm to determine that the space is occupied in response to the amount of movement and/or the velocity of movement exceeding an occupancy threshold.

Figure 2B:
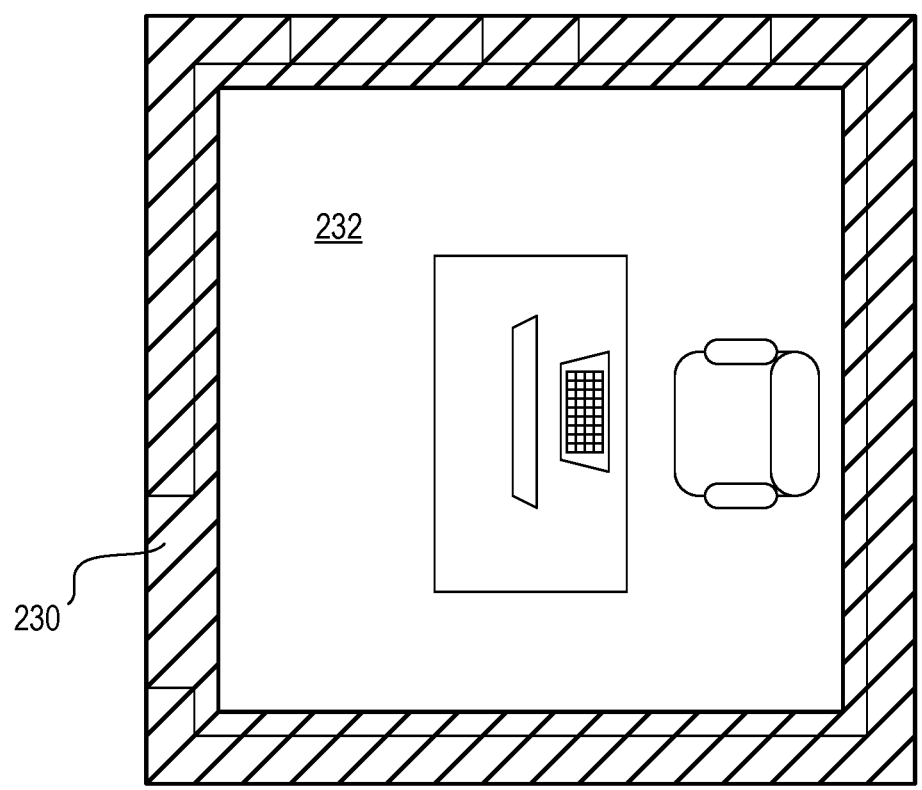

During a sensor event for detecting occupancy and/or vacancy, the visible light sensor 180 may be configured to apply a predetermined mask to focus on one or more regions of interest in one or more images recorded by the camera and determine occupancy or vacancy of the space based on detecting or not detecting motion in the regions of interest. The visible light sensor 180 may be responsive to movement in the regions of interest and not be responsive to movement in the masked-out areas. For example, as shown in FIG. 2B, the visible light sensor 180 may be configured to apply a mask 230 to an image of the room 200 to exclude detection of motion in the doorway 212 or the windows 214, and may focus on a region of interest 232 that include the interior space of the room 200. The visible light sensor 180 may be configured to apply a first mask to focus on a first region of interest, apply a second mask to focus on a second region of interest, and determine occupancy or vacancy based on movement detected in either of the regions of interest. In addition, the visible light sensor 180 may be configured to focus on multiple regions of interest in the image at the same time by applying different masks to the image(s).

Figure 2C:
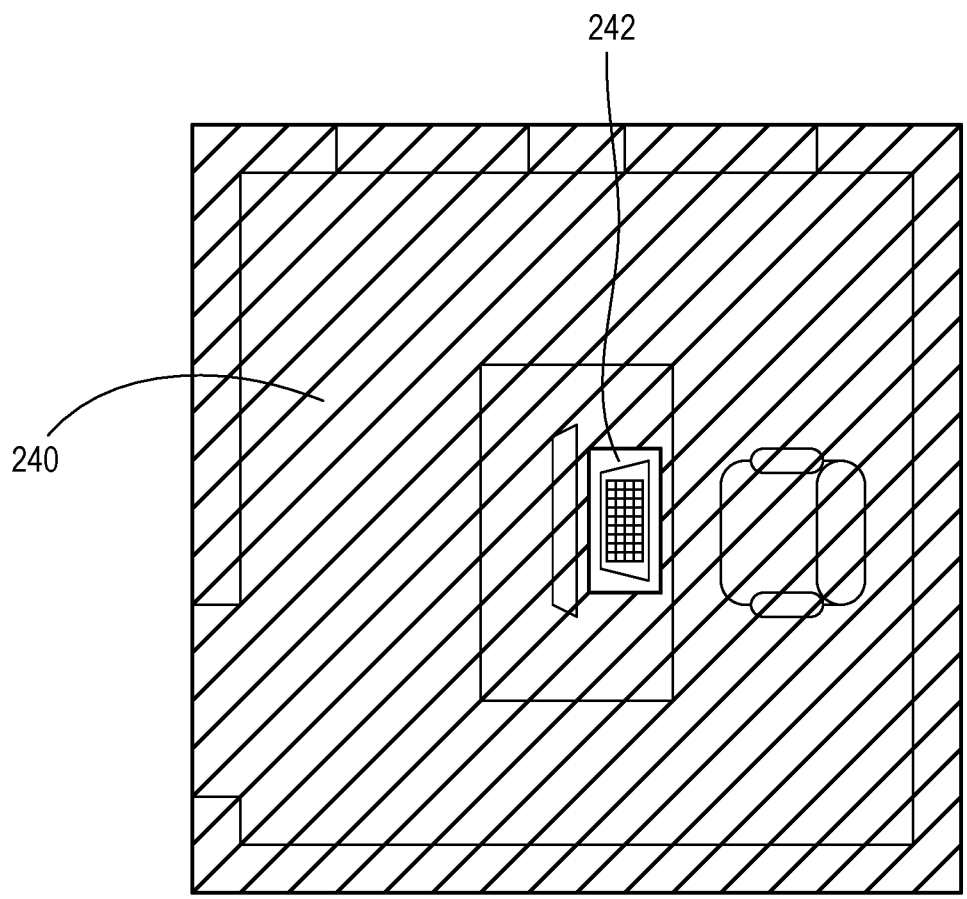

The visible light sensor 180 may be configured to adjust certain operational characteristics (e.g., sensitivity) to be used by the occupancy and/or vacancy algorithm depending upon the present sensor event. The occupancy threshold may be dependent upon the sensitivity. For example, the visible light sensor 180 may be configured to be more sensitive or less sensitive to movements in a first region of interest than in a second region of interest. For example, as shown in FIG. 2C, the visible light sensor 180 may be configured to increase the sensitivity and apply a mask 240 to focus on a region of interest 242 around the keyboard 224 to be more sensitive to movements around the keyboard. In other words, by using masks that focus on "smaller" vs "larger" (e.g., the keyboard vs. the desk surface on which the keyboard may sit), the visible light sensor 180 may be configured to increase and/or decrease the sensitivity of detected or not detected movements. In addition, through the use of masks, visible light sensor 180 may be configured to not simply detect movement in the space, but detect where that movement occurred.

Figure 2D:
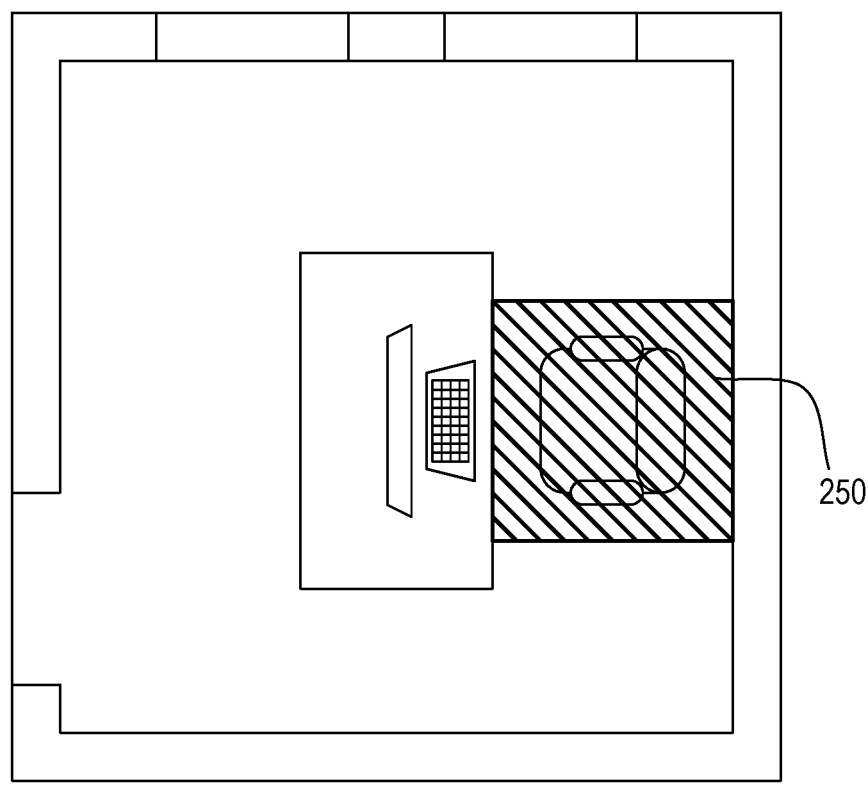

The visible light sensor 180 may also be configured to determine an occupancy and/or vacancy condition in the space in response to an occupant moving into or out of a bounded area. For example, as shown in FIG. 2D, the visible light sensor 180 may be configured to determine an occupancy condition in the room 200 in response to the occupant crossing a boundary of a bounded area 250 surrounding the chair 226 to enter the bounded area. After the occupant crosses the boundary, the visible light sensor 180 may assume that the space is occupied (e.g., independent of other sensor events of occupancy and/or vacancy) until the occupant leaves the bounded area 250. The visible light sensor 180 may not be configured to determine a vacancy condition in the room 200 until the occupancy crosses the boundary of the bounded area 250 to exit the bounded area. After the occupant leaves the bounded area, the visible light sensor 180 may be configured to detect a vacancy condition, for example, in response to determining that there is no movement in the region of interest 232 as shown in FIG. 2B. Thus, the visible light sensor 180 can maintain the occupancy condition even if the movement of the occupant are fine movements (e.g., if the occupant is sitting still or reading in the chair 226) or no movements (e.g., if the occupant is sleeping in a bed).

The bounded area may surround other structures in different types of rooms (e.g., other than the room 200 shown in FIG. 2D). For example, if the bounded area surrounds a hospital bed in a room, the system controller 110 may be configured to transmit an alert to the hospital staff in response to the detection of movement out of the region of interest (e.g., indicating that the patient got up out of the bed). In addition, the visible light sensor 180 may be configured count the number of occupants entering and exiting a bounded area.

The visible light sensor 180 may transmit digital messages to the system controller 110 via the RF signals 108 (e.g., using the proprietary protocol) in response to detecting the occupancy or vacancy conditions. The system controller 110 may be configured to turn the lighting loads (e.g., lighting load 122 and/or the LED light source 132) on and off in response to receiving an occupied command and a vacant command, respectively. Alternatively, the visible light sensor 180 may transmit digital messages directly to the lighting loads. The visible light sensor 180 may operate as a vacancy sensor, such that the lighting loads are only turned off in response to detecting a vacancy condition (e.g., and not turned on in response to detecting an occupancy condition). Examples of RF load control systems having occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

Figure 2E:
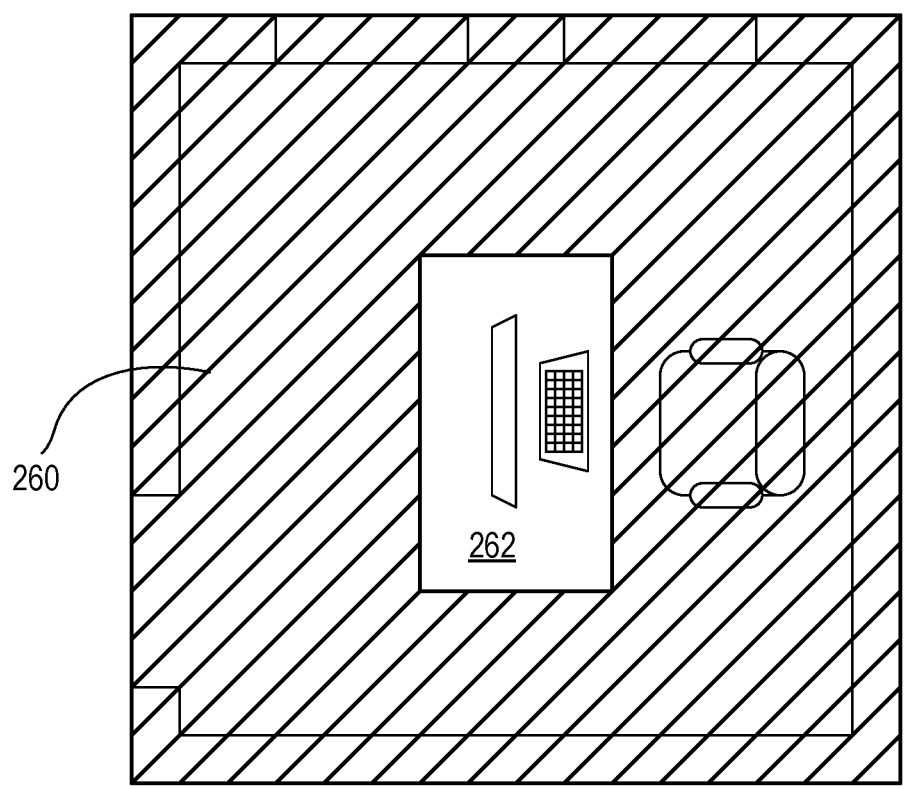

The visible light sensor 180 may also be configured to operate in the daylight sensor mode to measure a light intensity at a location of the space. For example, the visible light sensor 180 may apply a digital mask to focus on only a specific location in the space (e.g., on a task surface, such as a table 106 as shown in FIG. 1) and may use a daylighting algorithm to measure the light intensity at the location. For example, as shown in FIG. 2E, the visible light sensor 180 may be configured to apply a mask 260 to focus on a region of interest 262 that includes the surface of the desk 220. The visible light sensor 180 may be configured to integrate light intensities values of the pixels of the image across the region of interest 262 to determine a measured light intensity at the surface of the desk.

The visible light sensor 180 may transmit digital messages (e.g., including the measured light intensity) to the system controller 110 via the RF signals 108 for controlling the intensities of the lighting load 122 and/or the LED light source 132 in response to the measured light intensity. The visible light sensor 180 may be configured to focus on multiple regions of interest in the image recorded by the camera and measure the light intensity in each of the different regions of interest. Alternatively, the visible light sensor 180 may transmit digital messages directly to the lighting loads. The visible light sensor 180 may be configured to adjust certain operational characteristics (e.g., gain) based on the region of interest in which the light intensity is presently being measured. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The system controller 110 may be configured to determine a degradation in the light output of one or more of the lighting loads (e.g., the lighting load 122 and/or the LED light source 132) in the space, and to control the intensities of the lighting loads to compensate for the degradation (e.g., lumen maintenance). For example, the system controller 110 may be configured to individually turn on each lighting load (e.g., when it is dark at night) and measure the magnitude of the light intensity at a location (e.g., on the table 106 or the desk 220). For example, the system controller 110 may be configured to turn on the lighting load 122 at night and control the visible light sensor 180 to record an image of the room, to apply a mask to focus on a region of interest that the lighting load 122 illuminates (e.g., the surface of table 106 or the desk 220), to measure the light intensity in that region of interest, and to communicate that value to the system controller 110. The system controller 110 may store this value as a baseline value. At a time and/or date thereafter, the system controller 110 may repeat the measurement and compare the measurement to the baseline value. If the system controller 110 determines there to be a degradation, it may control the lighting load 122 to compensate for the degradation, alert maintenance, etc.

Figure 2F:
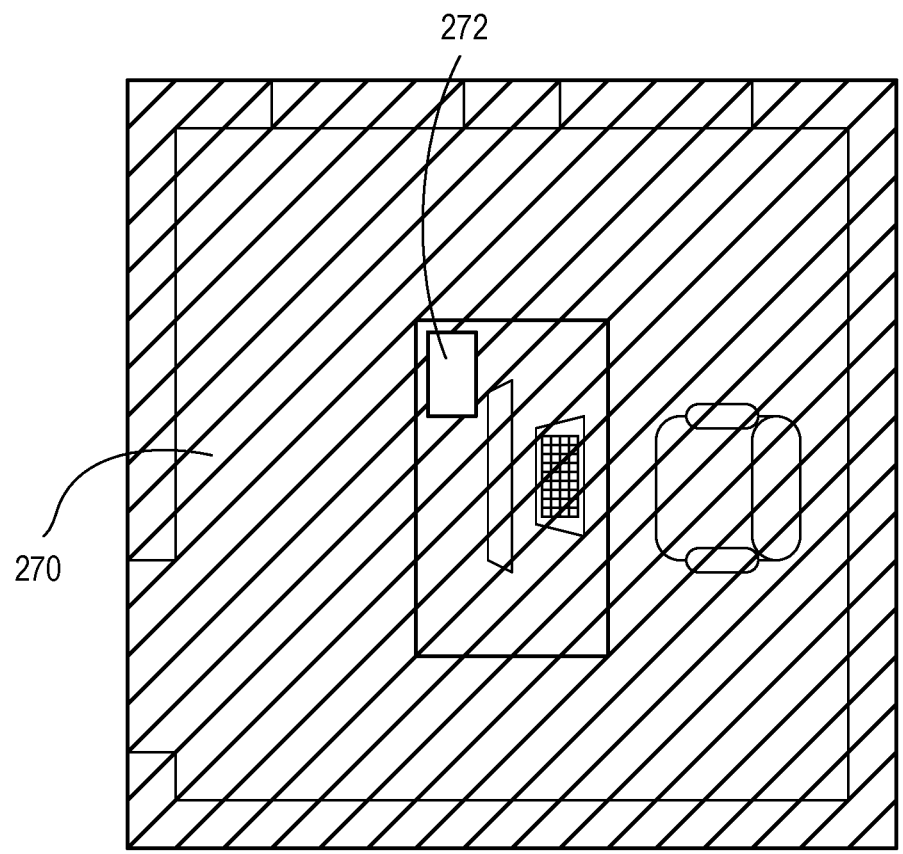

The visible light sensor 180 may also be configured to operate in the color sensor mode to sense a color (e.g., measure a color temperature) of the light emitted by one or more of the lighting loads in the space (e.g., to operate as a color sensor and/or a color temperature sensor). For example, as shown in FIG. 2F, the visible light sensor 180 may be configured to apply a mask 270 to focus on a region of interest 272 (that includes a portion of the surface of the desk 220) and may use a color sensing algorithm to determine a measured color and/or color temperature in the room 200. For example, the visible light sensor 180 may integrate color values of the pixels of the image across the region of interest 272 to determine the measured color and/or color temperature in the room 200. The visible light sensor 180 may transmit digital messages (e.g., including the measured color temperature) to the system controller 110 via the RF signals 108 for controlling the color (e.g., the color temperatures) of the lighting load 122 and/or the LED light source 132 in response to the measured light intensity (e.g., color tuning of the light in the space). Alternatively, the visible light sensor 180 may transmit digital messages directly to the lighting loads. An example of a load control system for controlling the color temperatures of one or more lighting loads is described in greater detail in commonly-assigned U.S. Patent Application Publication No. 2014/0312777, published Oct. 23, 2014, entitled SYSTEMS AND METHODS FOR CONTROLLING COLOR TEMPERATURE, the entire disclosure of which is hereby incorporated by reference.

Figure 2G:
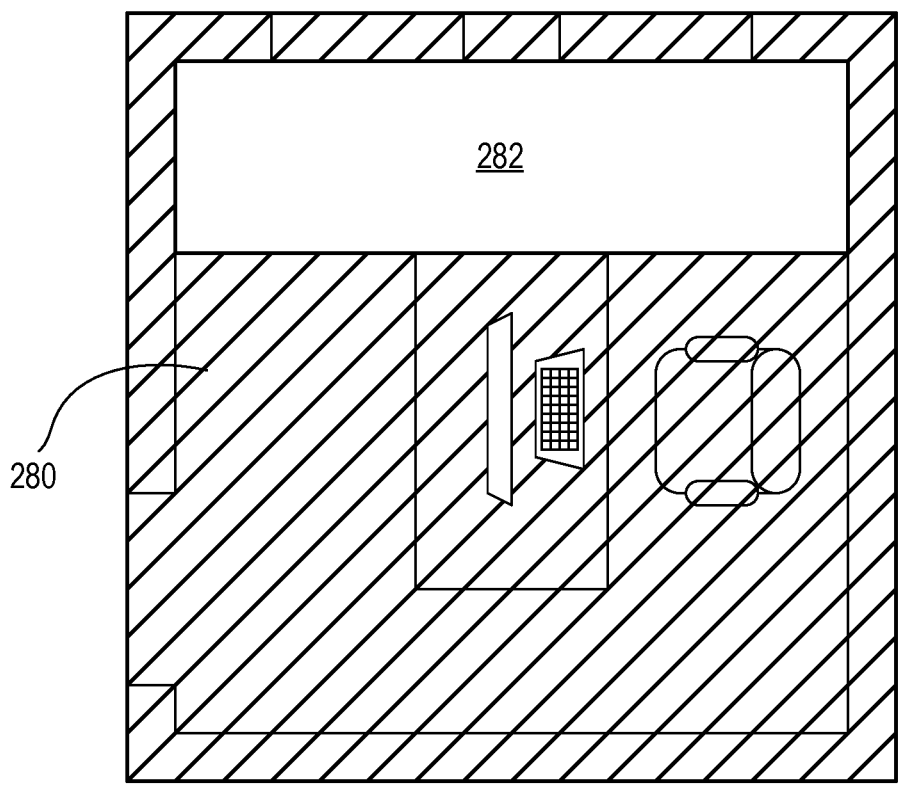

The visible light sensor 180 may be configured to operate in a glare detection sensor mode. For example, the visible light sensor 180 may be configured execute a glare detection algorithm to determine a depth of direct sunlight penetration into the space from the image recorded by the camera. For example, as shown in FIG. 2G, the visible light sensor 180 may be configured to apply a mask 280 to focus on a region of interest 282 on the floor of the room 200 near the windows 214 to sense the depth of direct sunlight penetration into the room. Based on a detection and/or measurement of the depth of direct sunlight penetration into the room, the visible light sensor 180 may transmit digital messages to the system controller 110 via the RF signals 108 to limit the depth of direct sunlight penetration into the space, for example, to prevent direct sunlight from shining on a surface (e.g., the table 106 or the desk 220). The system controller 110 may be configured to lower the window treatment fabric 152 of each of the motorized window treatments 150 to prevent the depth of direct sunlight penetration from exceeded a maximum sunlight penetration depth. Alternatively, the visible light sensor 180 may be configured to directly control the window treatments 150 to lower of the window treatment fabric 152. Examples of methods for limiting the sunlight penetration depth in a space are described in greater detail in commonly-assigned U.S. Pat. No. 8,288,981, issued Oct. 16, 2012, entitled METHOD OF AUTOMATICALLY CONTROLLING A MOTORIZED WINDOW TREATMENT WHILE MINIMIZING OCCUPANT DISTRACTIONS, the entire disclosure of which is hereby incorporated by reference.

The visible light sensor 180 may be configured to focus only on daylight entering the space through, for example, one or both of the windows 104 (e.g., to operate as a window sensor). The system controller 110 may be configured to control the lighting loads (e.g., the lighting load 122 and/or the LED light source 132) in response to the magnitude of the daylight entering the space. The system controller 110 may be configured to override automatic control of the motorized window treatments 150, for example, in response to determining that it is a cloudy day or an extremely sunny day. Alternatively, the visible light sensor 180 may be configured to directly control the window treatments 150 to lower of the window treatment fabric 152. Examples of load control systems having window sensors are described in greater detail in commonly-assigned U.S. Patent Application Publication No. 2014/0156079, published Jun. 5, 2014, entitled METHOD OF CONTROLLING A MOTORIZED WINDOW TREATMENT, the entire disclosure of which is hereby incorporated by reference.

The visible light sensor 180 may be configured to detect a glare source (e.g., sunlight reflecting off of a surface) outside or inside the space in response to the image recorded by the camera. The system controller 110 may be configured to lower the window treatment fabric 152 of each of the motorized window treatments 150 to eliminate the glare source. Alternatively, the visible light sensor 180 may be configured to directly control the window treatments 150 to lower of the window treatment fabric 152 to eliminate the glare source.

The visible light sensor 180 may also be configured to operate in the occupant count mode and may execute an occupant count algorithm to count the number of occupants a particular region of interest, and/or the number of occupants entering and/or exiting the region of interest. For example, the system controller 110 may be configured to control the HVAC system 162 in response to the number of occupants in the space. The system controller 110 may be configured to control one or more of the load control devices of the load control system 100 in response to the number of occupants in the space exceeding an occupancy number threshold. Alternatively, the visible light sensor 180 may be configured to directly control the HVAC system 162 and other load control devices.

The operation of the load control system 100 may be programmed and configured using, for example, the mobile device 190 or other network device (e.g., when the mobile device is a personal computing device). The mobile device 190 may execute a graphical user interface (GUI) configuration software for allowing a user to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the dimmer switch 120, the LED driver 130, the plug-in load control device 140, the motorized window treatments 150, and/or the thermostat 160). The load control database may comprise information regarding associations between the load control devices and the input devices (e.g., the remote control device 170, the visible light sensor 180, etc.). The load control database may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. patent application Ser. No. 13/830,237, filed Mar. 14, 2013, entitled COMMISSIONING LOAD CONTROL SYSTEMS, the entire disclosure of which is hereby incorporated by reference.

The operation of the visible light sensor 180 may be programmed and configured using the mobile device 190 or other network device. The visible light sensor 180 may comprise a second communication circuit for transmitting and receiving the RF signals 109 (e.g., directly with the network device 190 using a standard protocol, such as Wi-Fi or Bluetooth). During the configuration procedure of the load control system 100, the visible light sensor 180 may be configured to record an image of the space and transmit the image to the network device 190 (e.g., directly to the network device via the RF signals 109 using the standard protocol). The network device 190 may display the image on the visual display and a user may configure the operation of the visible light sensor 180 to set one or more configuration parameters (e.g., configuration information) of the visible light sensor. For example, for different environmental characteristic to be sensed and controlled by the visible light sensor 180 (e.g., occupant movements, light level inside of the room, daylight level outside of the room), the user may indicate different regions of interest on the image by tracing (such as with a finger or stylus) masked areas on the image displayed on the visual display. The visible light sensor 180 may be configured to establish different masks and/or operational characteristics depending upon the environmental characteristic to be sensed (e.g., occupant movements, light level inside of the room, daylight level outside of the room, color temperature, etc.).

After configuration of the visible light sensor 180 is completed at the network device 190, the network device may transmit configuration information to the visible light sensor (e.g., directly to the visible light sensor via the RF signals 109 using the standard protocol). The visible light sensor 180 may store the configuration information in memory, such that the visible light sensor may operate appropriately during normal operation. For example, for each sensor event the visible light sensor 180 is to monitor, the network device 190 may transmit to the visible light sensor 180 the sensor mode for the event, one or more masks defining regions of interest for the event, possibly an indication of the algorithm to be used to sense the environmental characteristic of the event, and one or more operational characteristics for the event.

The visible light sensor 180 may be configured in a way that protects the privacy of the occupants of the space. For example, the visible light sensor 180 may not be configured to transmit images during normal operation. The visible light sensor 180 may be configured to only use the images internally to sense the desired environmental characteristic (e.g., to detect occupancy or vacancy, to measure an ambient light level, etc.). For example, the visible light sensor 180 may be configured to transmit (e.g., only transmit) an indication of the detected state and/or measured environmental characteristic during normal operation (e.g., via the RF signals 108 using the proprietary protocol).

The visible light sensor 180 may be installed with special configuration software for use during the configuration procedure (e.g., for use only during the configuration procedure). The configuration software may allow the visible light sensor 180 to transmit a digital representation of an image recorded by the camera to the network device 190 only during the configuration procedure. The visible light sensor 180 may receive configuration information from the network device 190 (e.g., via the RF signals 109 using the standard protocol) and may store the configuration information in memory. The visible light sensor 180 may have the configuration software installed during manufacturing, such that the visible light sensor 180 is ready to be configured when first powered after installation. In addition, the system controller 110 and/or the network device 190 may be configured to transmit the configuration software to the visible light sensor 180 during the configuration procedure of the load control system 100.

The visible light sensor 180 may be configured to install normal operation software in place of the configuration software after the configuration procedure is complete. The normal operation software may not allow the visible light sensor 180 to transmit images recorded by the camera to other devices. The visible light sensor 180 may have the normal operation software stored in memory and may be configured to install the normal operation software after the configuration procedure is complete. In addition, the system controller 110 and/or the network device 190 may be configured to transmit the normal operation software to the visible light sensor 180 after the configuration procedure is complete.

Rather than installing special configuration software onto the visible light sensor 180 and then removing the special configuration software from the visible light sensor, a special configuration sensor (not shown) may be installed at the location of the visible light sensor 180 (e.g., in place of the visible light sensor 180) during configuration of the load control system 100. The configuration sensor may include the same camera and mechanical structure as the visible light sensor 180. The configuration sensor may include a first communication circuit for transmitting and receiving the RF signals 108 using the proprietary protocol and a second communication circuit for transmitting and receiving the RF signals 109 using the standard protocol. During the configuration procedure of the load control system 100, the configuration sensor may be configured to record an image of the space and transmit the image to the network device 190 (e.g., directly to the network device via the RF signals 109 using the standard protocol). The network device 190 may display the image on the visual display and a user may configure the operation of the visible light sensor 180. For example, the visible light sensor 180 and the configuration sensor may be mounted to a base portion that remains connected to the ceiling or wall, such that the configuration sensor may be mounted in the exact same location during configuration that the visible light sensor is mounted during normal operation.

The configuration sensor may then be uninstalled and the visible light sensor 180 may be installed in its place for use during normal operation of the load control system 100. The visible light sensor 180 for use during normal operation may not be capable of transmitting images via the RF signals 109 using the standard protocol. The visible light sensor 180 for use during normal operation may only comprise a communication circuit for transmitting and receiving the RF signals 108 using the proprietary protocol. After the visible light sensor 180 is installed, the network device 190 may transmit the configuration information to the system controller 110 via the RF signals 109 (e.g., using the standard protocol), and the system controller may transmit the configuration information to the visible light sensor via the RF signal 108 (e.g., using the proprietary protocol). The visible light sensor 180 may store the configuration information in memory of the sensor. During normal operation, the visible light sensor 180 may transmit, for example, an indication of the sensed environmental characteristic during normal operation via the RF signals 108 (e.g., using the proprietary protocol).

Further, the visible light sensor 180 may comprise a removable configuration module for use during configuration of the visible light sensor 180. The visible light sensor 180 may comprise a first permanently-installed communication circuit for transmitting and receiving the RF signals 108 using the proprietary protocol. The removable configuration module may comprise a second communication circuit for transmitting and receiving the RF signals 109 using the standard protocol. When the configuration module is installed in the visible light sensor 180 and the second communication circuit is electrically coupled to the visible light sensor, the visible light sensor may record an image of the space and transmit the image to the network device 190 (e.g., directly to the network device via the RF signals 109 using the standard protocol). The network device 190 may transmit the configuration information to the visible light sensor 180 while the configuration module is still installed in the visible light sensor, and the visible light sensor may store the configuration information in memory. The configuration module may then be removed from the visible light sensor 180, such that the visible light sensor is subsequently unable to transmit images via the RF signals 109 using the standard protocol.

Figure 3:
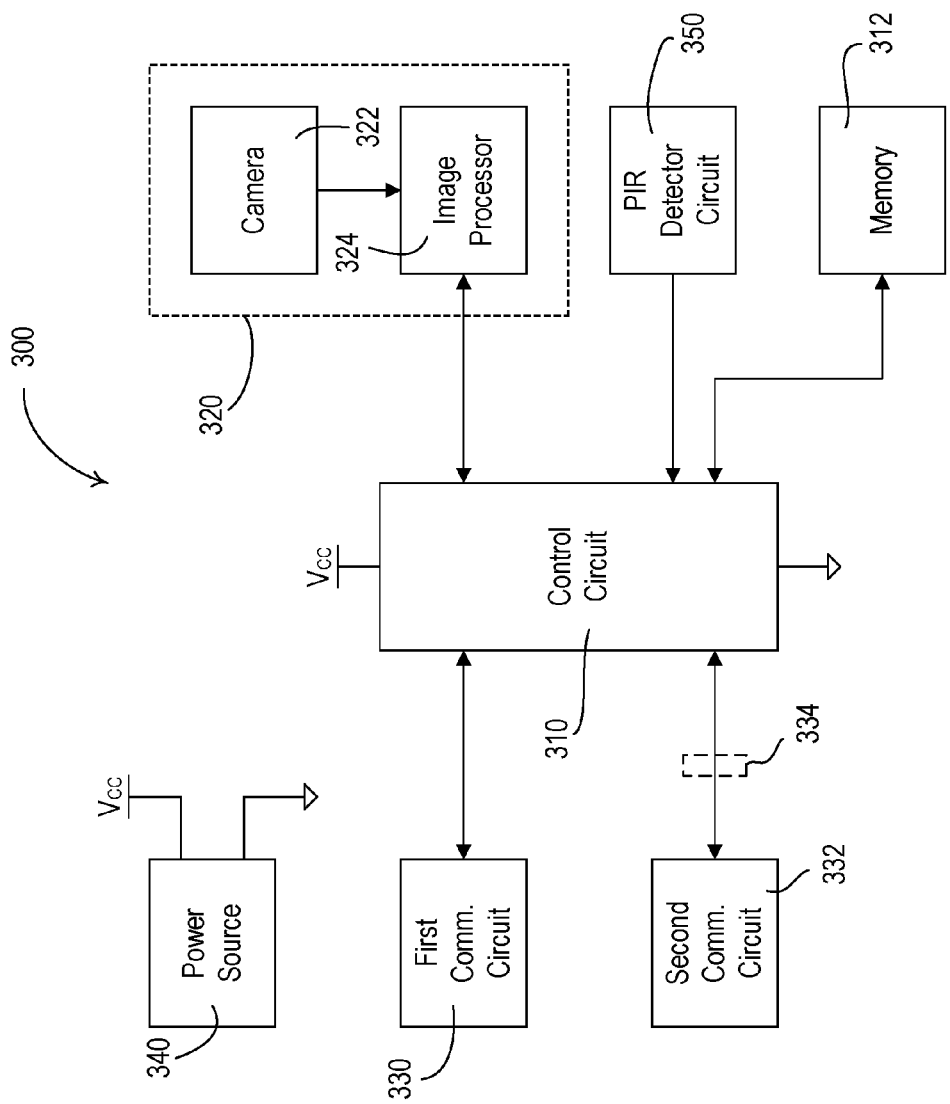
FIG. 3 is a simplified block diagram of an example visible light sensor.

FIG. 3 is a simplified block diagram of an example visible light sensor 300, which may be deployed as the visible light sensor 180 of the load control system 100 shown in FIG. 1. The visible light sensor 300 may comprise a control circuit 310, for example, a microprocessor, a programmable logic device (PLD), a microcontroller, an application specific integrated circuit (ASIC), a field-programmable gate array (FPGA), or any suitable processing device. The control circuit 310 may be coupled to a memory 312 for storage of sensor events, masks, operational characteristics, etc. of the visible light sensor 300. The memory 312 may be implemented as an external integrated circuit (IC) or as an internal circuit of the control circuit 310.

The visible light sensor 300 may comprise a visible light sensing circuit 320 having an image recording circuit, such as a camera 322, and an image processing circuit, such as a processor 324. The image processor 324 may comprise a digital signal processor (DSP), a microprocessor, a programmable logic device (PLD), a microcontroller, an application specific integrated circuit (ASIC), a field-programmable gate array (FPGA), or any suitable processing device. The camera 322 may be positioned towards a space in which one or more environmental characteristics are to be sensed in a space (e.g., into the room 102 or the room 200). The camera 322 may be configured to capture or record an image. For example, the camera 3222 may be configured to capture images at a particular sampling rate, where a single image may be referred to as a frame acquisition. One example frame acquisition rate is approximately ten frames per second. The frame acquisition rate may be limited to reduce the required processing power of the visible light sensor. Each image may consist of an array of pixels, where each pixel has one or more values associated with it. A raw RGB image may have three values for each pixel: one value for each of the red, green, and blue intensities, respectively. One implementation may use the existing RGB system for pixel colors, where each component of the intensity has a value from 0-255. For example, a red pixel would have an RGB value of (255, 0, 0), whereas a blue pixel would have an RGB value of (0, 0, 255). Any given pixel that is detected to be a combination of red, green, and/or blue may be some combination of (0-255, 0-255, 0-255). One will recognize that over representations for an image may be used.

The camera 322 may provide the captured image (e.g., a raw image) to the image processor 324. The image processor 324 may be configured to process the image and provide to the control circuit 310 one or more sense signals that are representative of the sensed environmental characteristics (e.g., an occurrence of movement, an amount of movement, a direction of movement, a velocity of movement, a counted number of occupants, a light intensity, a light color, an amount of direct sunlight penetration, etc.). For example, the one or more sense signals provided to the control circuit 310 may be representative of movement in the space and/or a measured light level in the space.

In addition, the image processor 324 may provide a raw image or a processed (e.g., preprocessed) image to the control circuit 310, which may be configured to process the image to determine sensed environmental characteristics. Regardless, the control circuit 310 may then use the sensed environmental characteristics to transmit control commands to load devices (e.g., directly or through system controller 110).

One example of a processed image, as is known in the art, is the luminance of a pixel, which can be measured from the image RGB by adding R, G, B intensity values, weighted according to the following formula:

$$\text{Luminance (perceived)}=(0.299*R+0.587*G+0.114*B).$$

The example weighting coefficients factor in the non-uniform response of the human eye to different wavelengths of light. However, other coefficients may alternatively be used.

As previously mentioned, if the visible light sensor 300 have a fish-eye lens, the image captured by the camera 322 may be warped. The image processor 324 may be configured to preprocess the image to warp the image and to generate a non-warped image (e.g., as shown in FIGS. 2A-2G).

Another image processing technique includes mapping the RGB sensor response to CIE tristimulus values to acquire chromaticity coordinates and thereby the Correlated Color Temperature (CCT). An example method is described by Joe Smith in the following reference: *Calculating Color Temperature and Illuminance using the TAOS TCS3414CS Digital Color Sensor, Intelligent Opto Sensor Designer's Notebook*, Feb. 27, 2009. Another known example of a processed image is an image to which a digital filter, or a digital mask has been applied. A digital mask may be used to eliminate regions within the image which have little to no value for further analysis and processing. Alternatively, a complement of a digital mask is a region of interest, or an area within an image that has been identified for further processing or analysis. A processed image may also be created via a technique known as background subtraction. Using this technique, a background image, which incorporates the history of the image over time (here, the previous state of the room), may be subtracted from the current image (current state of the room) in order to identify differences in the images. Background subtraction is useful for detecting movement in an image and for occupancy and vacancy detection. Various algorithms may be used for background maintenance, to determine how to effectively combine pixels over time into the background image. Some example background maintenance algorithms include: adjusted frame difference, mean and threshold, mean and covariance, mixture of Gaussians, and normalized block correlation. These and other similar details inherent to image processing would be familiar to one skilled in the art.

The control circuit 310 and/or the image processor 324 may be configured to apply one or more masks to focus on one or more regions of interest in the image (e.g., the raw image and/or the preprocessed image) to sense one or more environmental characteristics of the space. As used herein, a mask may be any definition to define a region of interest of an image. For example, assuming an image may be defined as an N×M array of pixels where each pixel has a defined coordinate/position in the array, a mask be defined as a sequence of pixel coordinates that define the outer perimeter of a region of interest within the image. As another example, a mask may be define as an N×M array that corresponds to the N×M array of pixels of an image. Each entry of the mask be a 1 or 0, for example, whereby entries having a 1 define the region of interest. Such a representation may allow and image array and a mask array to be "ANDED" to cancel or zero out all pixels of the image that are not of interest. As another alternative, rather than a mask defining the region of interest of the image, it may define the region that in not of interest. These are merely examples and other representations may be used.

The visible light sensor 300 may comprise a first communication circuit 330 configured to transmit and receive digital messages via a first communication link using a first protocol. For example, the first communication link may comprise a wireless communication link and the first communication circuit 330 may comprise an RF transceiver coupled to an antenna. In addition, the first communication link may comprise a wired digital communication link and the first communication circuit 330 may comprise a wired communication circuit. The first protocol may comprise a proprietary protocol, such as, for example, the ClearConnect protocol. The control circuit 310 may be configured to transmit and receive digital messages via the first communication link during normal operation of the visible light sensor 300. The control circuit 310 may be configured to transmit an indication of the sensed environmental characteristic via the first communication link during normal operation of the visible light sensor 300. For example, the control circuit 310 may be configured to transmit an indication of a detected state (e.g., an occupancy or vacancy condition) and/or a measured environmental characteristic (e.g., a measured light level) via the first communication link during normal operation of the visible light sensor 300.

The visible light sensor 300 may comprise a second communication circuit 332 configured to transmit and receive digital messages via a second communication link using a second protocol. For example, the second communication link may comprise a wireless communication link and the second communication circuit 332 may comprise an RF transceiver coupled to an antenna. In addition, the second communication link may comprise a wired digital communication link and the second communication circuit 332 may comprise a wired communication circuit. The second protocol may comprise a standard protocol, such as, for example, the Wi-Fi protocol, the Bluetooth protocol, the Zigbee protocol, etc. The control circuit 310 may be configured to transmit and receive digital messages via the second communication link during configuration of the visible light sensor 300. For example, the control circuit 310 may be configured to transmit an image recorded by the camera 322 via the second communication link during configuration of the visible light sensor 300.

The visible light sensor 300 may comprise a power source 340 for producing a DC supply voltage $V_{CC}$ for powering the control circuit 310, the memory 312, the image processor 324, the first and second communication circuits 330, 332, and other low-voltage circuitry of the visible light sensor 300. The power source 340 may comprise a power supply configured to receive an external supply voltage from an external power source (e.g., an AC mains line voltage power source and/or an external DC power supply). In addition, the power source 340 may comprise a battery for powering the circuitry of the visible light sensor 300.

The visible light sensor 300 may further comprise a low-power occupancy sensing circuit, such as a passive infrared (PIR) detector circuit 350. The PIR detector circuit 350 may generate a PIR detect signal $V_{PIR}$ (e.g., a low-power occupancy signal) that is representative of an occupancy and/or vacancy condition in the space in response to detected passive infrared energy in the space. The PIR detector circuit 350 may consume less power than the visible light sensing circuit 320. However, the visible light sensing circuit 320 may be more accurate than the PIR detector circuit 350. For example, when the power source 340 is a battery, the control circuit 310 may be configured to disable the visible light sensing circuit 320 and use the PIR detector circuit 350 to detect occupancy conditions. The control circuit 310 may disable the light sensing circuit 320, for example, when the space is vacant. The control circuit 310 may detect an occupancy condition in the space in response to the PIR detect signal $V_{PIR}$ and may subsequently enable the visible light sensing circuit 320 to detect a continued occupancy condition and/or a vacancy condition. The control circuit 310 may enable the visible light sensing circuit 320 immediately after detecting an occupancy condition in the space in response to the PIR detect signal $V_{PIR}$. The control circuit 310 may also keep the visible light sensing circuit 320 disabled after detecting an occupancy condition in the space (in response to the PIR detect signal $V_{PIR}$). The control circuit 310 may keep the visible light sensing circuit 320 disabled until the PIR detect signal $V_{PIR}$ indicates that the space is vacant. The control circuit 310 may not make a determination that the space is vacant until the visible light sensing circuit 320 subsequently indicates that the space is vacant.

The visible light sensor 300 may be configured in a way that protects the privacy of the occupants of the space. For example, the control circuit 310 may execute special configuration software that allows the control circuit 310 to transmit an image recorded by the camera 322 via the second communication link only during configuration of the visible light sensor 300. The configuration software may be installed in the memory 312 during manufacturing, such that the visible light sensor 300 is ready to be configured when first powered after installation. In addition, the control circuit 310 may be configured to receive the configuration software via the first or second communication links and store the configuration software in the memory during configuration of the visible light sensor 300. The control circuit 310 may execute normal operation software after configuration of the visible light sensor 300 is complete. The normal operation software may be installed in the memory 312 or may be received via the first or second communication links during configuration of the visible light sensor 300.

The second communication circuit 332 may be housed in a removable configuration module that may be installed in the visible light sensor 320 and electrically connected to the control circuit 310 only during configuration of the visible light sensor. When the configuration module is installed in the visible light sensor 300 and the second communication circuit 332 is electrically coupled to the control circuit 310 (e.g., via a connector 334), the control circuit may transmit an image recorded by the camera 322 to via the second communication link. The control circuit 310 may subsequently receive configuration information via the first or second communication links and may store the configuration information in the memory 312. The configuration module may then be removed from the visible light sensor 300, such that the control circuit 310 is subsequently unable to transmit images via the second communication link.

In addition, the visible light sensor 300 that is installed in the space during normal operation may not comprise the second communication circuit, such that the visible light sensor is never able to transmit images via the second communication link. The visible light sensor 300 may be configured using a special configuration sensor that may have an identical structure as the visible light sensor 300 shown in FIG. 3 and may include both a first communication circuit for communicating via the first communication link and a second communication circuit for communicating via the second communication link. The special configuration sensor may be configured to record an image using the camera and transmit the image via the second communication link. The special configuration sensor may then be uninstalled and the visible light sensor 300 (that does not have the second communication link 332) may then be installed in its place for use during normal operation. The control circuit 310 of the visible light sensor 300 may receive configuration information via the first communication link and may store the configuration information in the memory 312.

Figure 4:
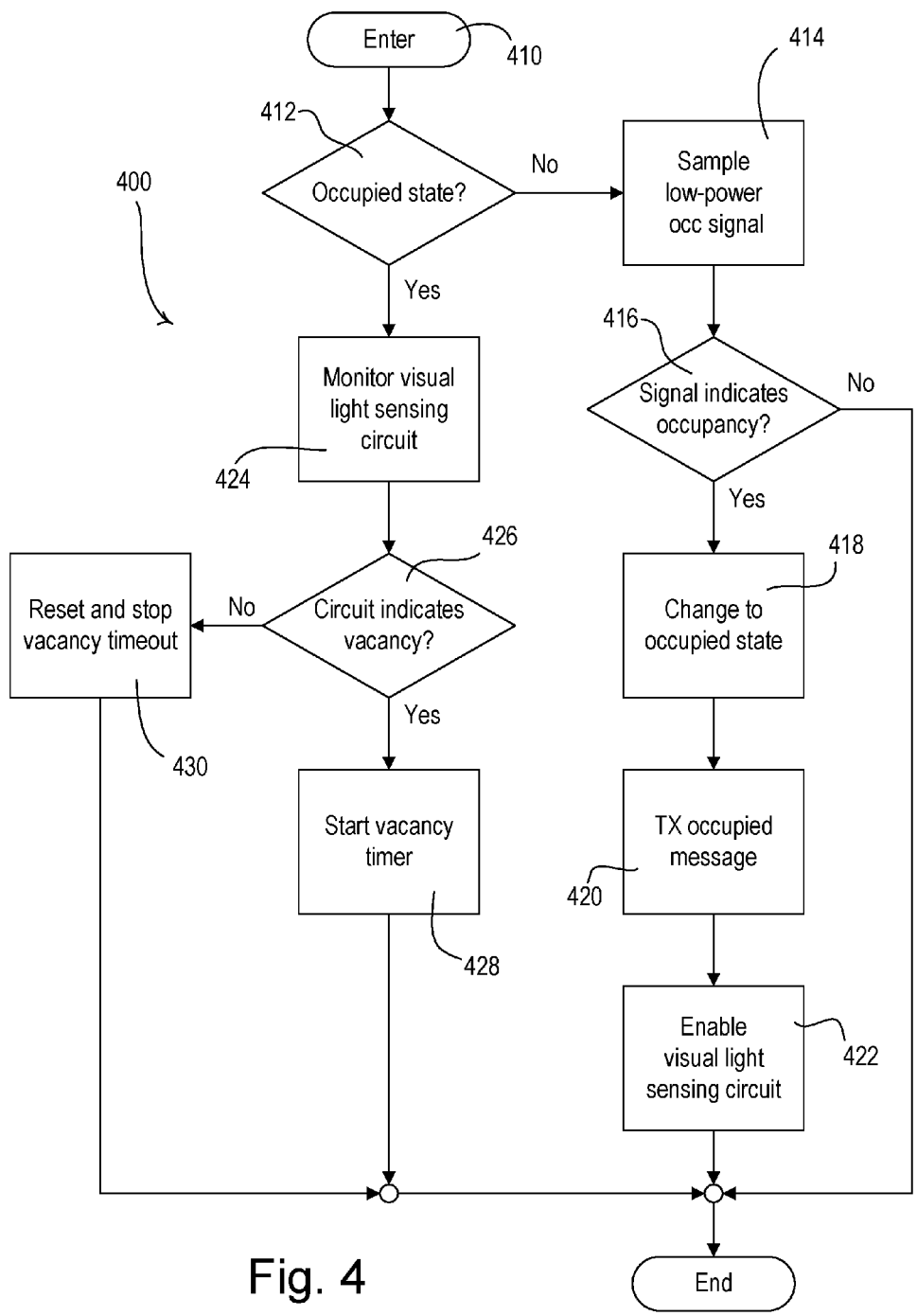
FIGS. 4 and 5 show flowcharts of example control procedures that may be executed by a control circuit of a visible light sensor.

FIG. 4 shows a flowchart of an example control procedure 400 executed periodically by a control circuit of a visible light sensor (e.g., the control circuit 310 of the visible light sensor 300) at step 410. In the control procedure 400, the control circuit may operate in an occupied state when an occupancy condition is detected and in a vacant state when a vacancy condition is detected. If the control circuit is not operating in the occupied state at step 412, the control circuit may sample a low-power occupancy signal (e.g., the PIR detect signal $V_{PIR}$) at step 414. If the PIR detect signal $V_{PIR}$ indicates that the space is vacant at step 416, the control procedure 400 may simply exit. If the PIR detect signal $V_{PIR}$ indicates that the space is occupied at step 416, the control circuit may change to the occupied state at step 418, transmit an occupied message (e.g., via the first communication link using the proprietary protocol) at step 420, and enable a visible light sensing circuit (e.g., the visible light sensing circuit 320) at step 422, before the control procedure 400 exits. As shown in FIG. 4, the control circuit may enable the visible light sensing circuit immediately after detecting an occupancy condition in response to the PIR detect signal $V_{PIR}$.

If the control circuit is operating in the occupied state at step 412, the control circuit may monitor the visible light sensing circuit (e.g., monitor the sense signals generated by visible light sensing circuit) at step 424. If the visible light sensing circuit indicates that the space is vacant at step 426, the control circuit may start a vacancy timer at step 428, before the control procedure 400 exits. If the vacancy timer expires without the control circuit detecting any further movement in the space, the control circuit may then switch to the vacant state. If the visible light sensing circuit indicates that the space is occupied at step 426, the control circuit may reset and stop the vacancy timer at step 430, before the control procedure 400 exits.

Figure 5:
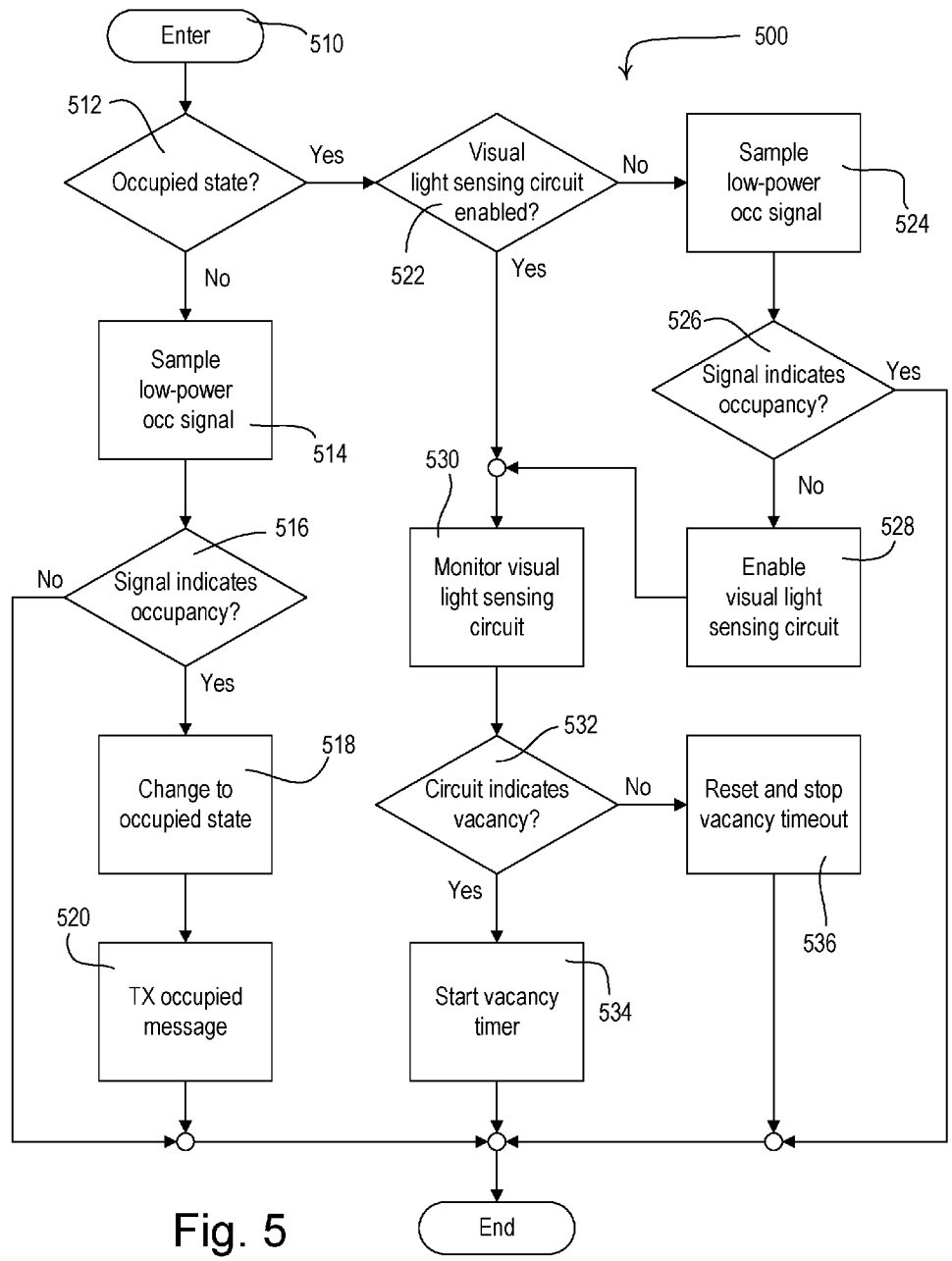

FIG. 5 shows a flowchart of another example control procedure 500 executed periodically by a control circuit of a visible light sensor (e.g., the control circuit 310 of the visible light sensor 300) at step 510. If the control circuit is not operating in the occupied state at step 512, the control circuit may sample a low-power occupancy signal (e.g., the PIR detect signal $V_{PIR}$) at step 514. If the PIR detect signal $V_{PIR}$ indicates that the space is vacant at step 516, the control procedure 500 may simply exit. If the PIR detect signal $V_{PIR}$ indicates that the space is occupied at step 516, the control circuit may change to the occupied state at step 518 and transmit an occupied message (e.g., via the first communication link using the proprietary protocol) at step 520, before the control procedure 500 exits.

If the control circuit is operating in the occupied state at step 512 and a visible light sensing circuit (e.g., the visible light sensing circuit 220) is presently disabled at step 522, the control circuit may sample the PIR detect signal $V_{PIR}$ at step 524. If the PIR detect signal $V_{PIR}$ indicates that the space is occupied at step 526, the control procedure 500 may simply exit. If the PIR detect signal $V_{PIR}$ indicates that the space is vacant at step 516, the control circuit may enable the visible light sensing circuit at step 528 and monitor the visible light sensing circuit (e.g., monitor the sense signals generated by visible light sensing circuit) at step 530. As shown in FIG. 5, the control circuit may keep the visible light sensing circuit disabled until the PIR detect signal $V_{PIR}$ indicates that the space is vacant.

If the visible light sensing circuit is already enabled at step 522, the control circuit may simply monitor the visible light sensing circuit at step 530. If the visible light sensing circuit indicates that the space is vacant at step 532, the control circuit may start a vacancy timer at step 534, before the control procedure 500 exits. If the visible light sensing circuit indicates that the space is occupied at step 532, the control circuit may reset and stop the vacancy timer at step 536, before the control procedure 500 exits.

Figure 6:
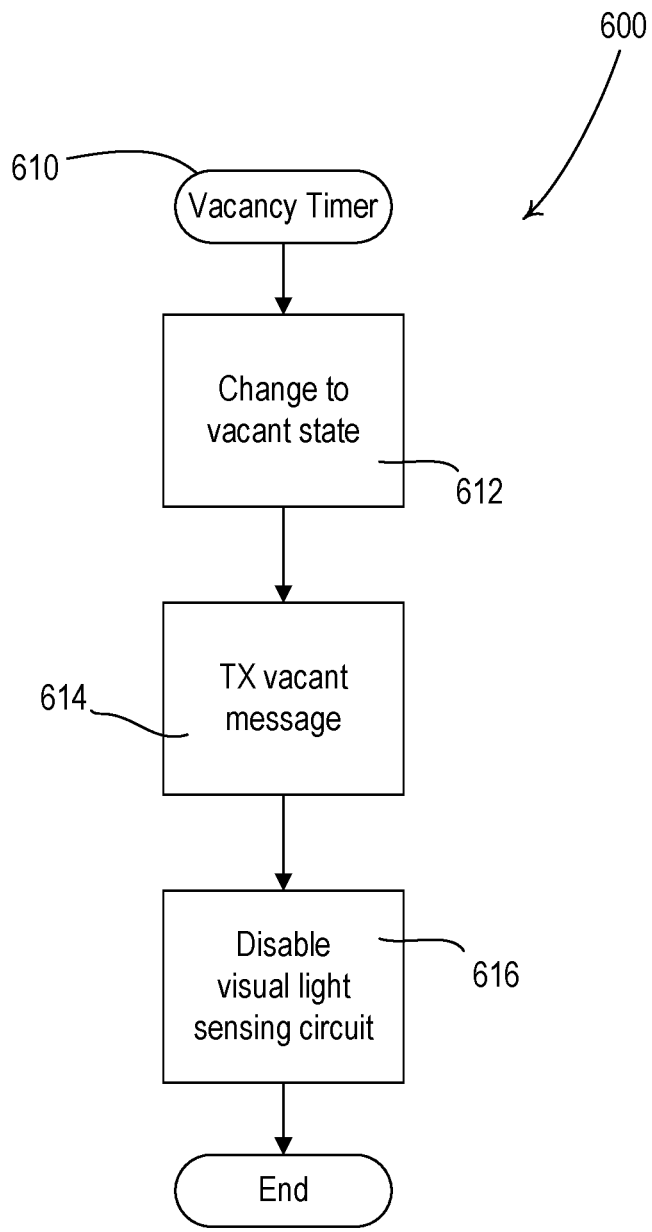
FIG. 6 shows a flowchart of an example vacancy time procedure that may be executed by a control circuit of a visible light sensor.

FIG. 6 is a flowchart of an example vacancy timer procedure 600 executed by a control circuit of a visible light sensor (e.g., the control circuit 310 of the visible light sensor 300) when the vacancy timer expires at step 610. The control circuit may first change to the vacant state at step 612 and transmit a vacant message (e.g., via the first communication link using the proprietary protocol) at step 614. The control circuit may then disable the visible light sensing circuit at step 616, before the vacancy timer procedure 600 exits.

Figure 7:
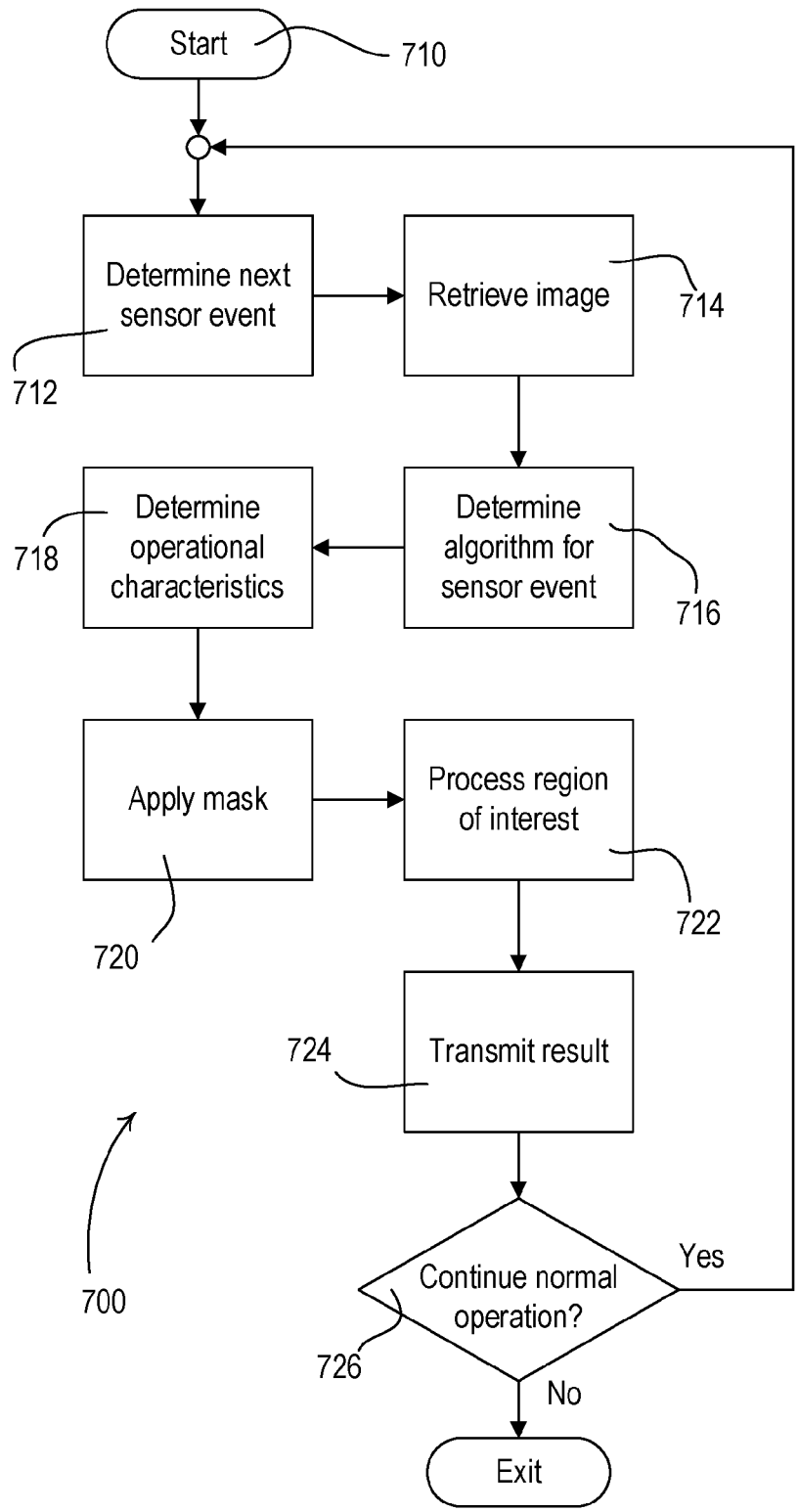
FIG. 7 shows a flowchart of an example sensor event procedure that may be executed by a control circuit of a visible light sensor.

FIG. 7 shows a flowchart of an example sensor event procedure 700 that may be executed by a control circuit of a visible light sensor (e.g., the control circuit 310 of the visible light sensor 300). The control circuit may execute the sensor event procedure 700 to step through sensor events to sense a plurality of environmental characteristics of a space (e.g., the room 102 or the room 200). For example, the sensor event procedure 700 may begin at step 710 during normal operation of the visible light sensor. At step 712, the control circuit may determine the next sensor event that may be stored in memory. For example, the first time that the control circuit executes step 712, the control circuit may retrieve the first sensor event from memory. The control circuit may then retrieves an image from a camera and/or an image processor of the visible light sensor (e.g., the camera 322 and/or the image processor 324) at step 714. For example, the control circuit may retrieve a raw image (e.g., a frame acquisition from the camera 322) or a preprocessed image (e.g., a background-subtracted image).

At step 716, the control circuit may determine an algorithm to use to process the image to sense the environmental characteristic of the present sensor event. At step 718, the control circuit may determine operational characteristics to use when executing the algorithm for the present sensor event. At step 720, the control circuit may apply a mask(s) (e.g., that may be stored in memory for the present sensor event) to the image (e.g., that may be retrieved at step 714) in order to focus on one or more regions of interest in the image. The control circuit may then process the region of interest of the image using the determined algorithm and operational characteristics of the present sensor event at step 722 and transmit the result (e.g., via RF signals 108 using the first communication circuit 330) at step 724. If the control circuit should continue normal operation at step 726, the sensor event procedure 700 may loop around to execute the next sensor event at steps 712-724. If the control circuit should cease normal operation at step 726 (e.g., in response to a user input to cease normal operation or other interrupt to normal operation), the sensor event procedure 700 may exit.

A designer or specifier of the space may set target illuminance levels for the amount of light shining directly on a task surface (e.g., the table 106 or the desk 220). The load control system may be commissioned to operate within the target illuminance levels. To calibrate the visible light sensor to the light levels within the space, a luminance measurement may be taken with the lights at a high-end (or full) intensity when no external light is present (e.g., at nighttime or with covering material of all motorized window treatments in the space fully closed). The luminance measurement may be taken for the entire image, or may be integrated over a region of interest. The luminance measurement taken with no external light may be used as a baseline for comparison with subsequent luminance measurements. For example, the visible light sensor may periodically record a new baseline (nightly, monthly, bimonthly, etc.) and compare the new baseline to the first baseline. If the luminance values have changed significantly (delta between the images is greater than a depreciation threshold), the visible light sensor (or a system controller) may determine that the light intensity has depreciated due to aging of the fixture and may send a command to compensate for the delta until the new baseline image matches the first baseline image (e.g., until the delta is less than the depreciation threshold).

The visible light sensor may additionally or alternatively measure a baseline and a depreciation delta specific to the color of the light fixture (e.g., separately for warm white and cool white light emitters). For example, a first baseline color reading may be taken at night with the covering material of the motorized window treatments closed, and the lighting fixtures set to a high-end (or full) intensity of cool light (e.g., the blue end of the white color spectrum), and a second baseline color reading for warm light (e.g., the red end of the white color spectrum). The baselines may be taken periodically (e.g., nightly or monthly) to determine if the lumen output of the fixtures has depreciated over time. If the visible light sensor determines the lumen output has depreciated, the visible light sensor and/or the system controller may instruct the light fixtures to increase the light output to compensate accordingly.

The baseline images may also be used to determine the amount of external light in a space. For example, the visible light sensor may record an image and compare it to a stored baseline image. The visible light sensor may scale or weight the luminance values for the recorded image or for the baseline based on the current intensity of the light in the room. For example, if the light fixtures are set to 50%, the visible light sensor may scale this intensity to match the baseline, if the baseline was recorded at a high end intensity of 85%. Once the luminance values of the artificial light have been scaled, based on this comparison, the visible light sensor may determine the amount of external light present in one or more regions of interest. If the visible light sensor determines that external light is present, the visible light sensor and/or the system controller may send a command to the light fixtures to decrease the light output to meet the target illuminance for the space. This feedback loop which saves energy by harvesting external light is called daylighting.

The baseline image may further be used in glare detection and mitigation. Furthermore, the luminance of the baseline image may be determined in one or more regions of interest within a room. For example, the visible light sensor may retrieve an image of the room, may obtain the region of interest from the image by applying a mask to the image, and determine a luminance value for the region of interest by computing a luminance value for each image pixel making up the region of interest and then integrating or averaging the computed luminance values to obtain a baseline luminance value.

Figure 8:
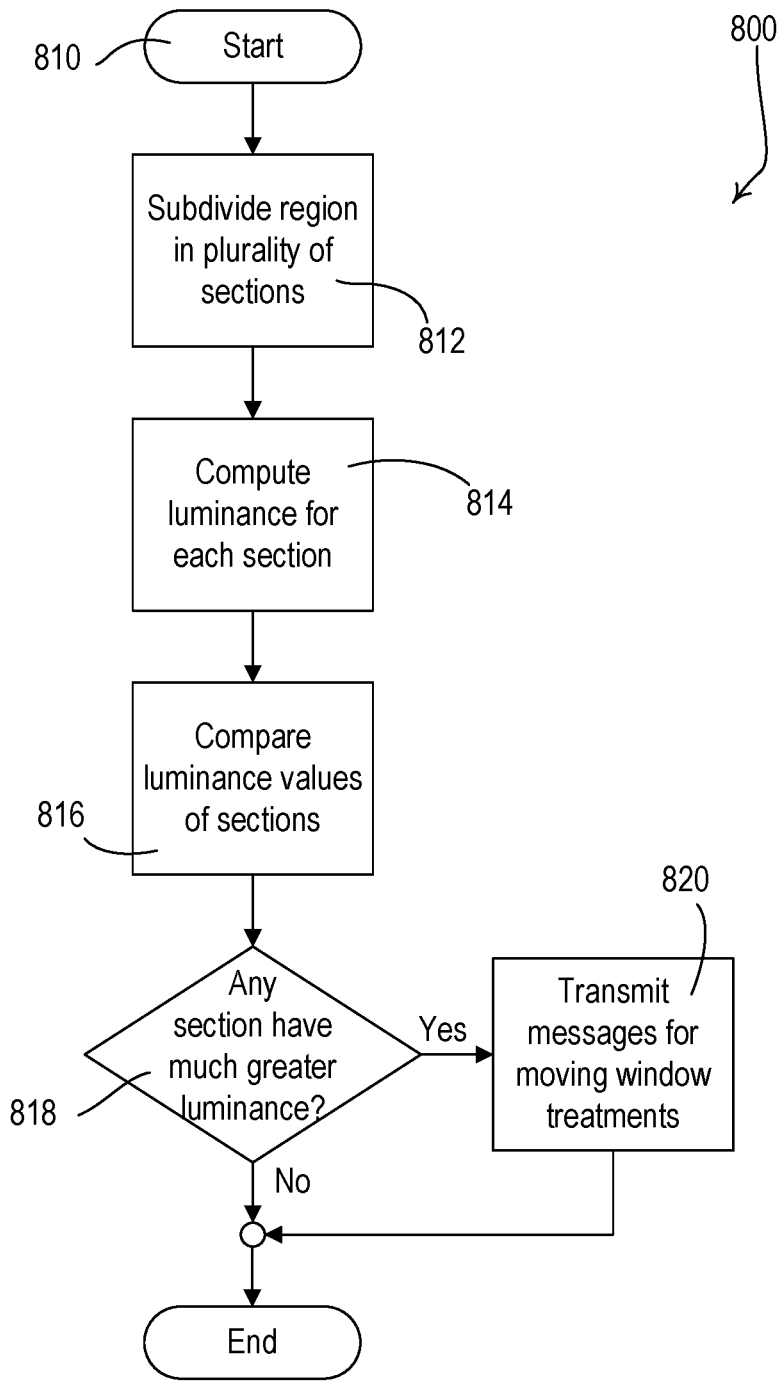
FIGS. 8 and 9 show flowcharts of example glare detection procedures that may be executed by a control circuit of a visible light sensor.

FIG. 8 is a flowchart of an example glare detection procedure 800, which may be executed by a control circuit of a visible light sensor (e.g., the control circuit 310 of the visible light sensor 300) to process a sensor event that includes detecting whether sunlight entering from a window (e.g., the windows 104, 214) may be shining on (e.g., producing glare on) only a portion of a region of interest and if glare is detected, to operate motorized window treatments (e.g., the motorized window treatments 150) to eliminate the partial glare. For example, a region of interest may be defined to be a desk surface within a room (e.g., the region of interest 262 in the room 200 shown in FIG. 2E). The visible light sensor may be configured to determine whether sunlight is partially shining upon the surface of the desk and when present, to eliminate the glare by operating motorized window treatments. According to this example, once obtaining the region of interest from a retrieved image by applying a mask for that region to the image, the visible light sensor may analyze the region of interest to determine if one or more portions/sections of the region of interest have a different luminance than one or more other portions of the region of interest and if so, may determine that glare is present at only a portion of the region.

The glare detection procedure 800 may start at step 810. At step 812, the visible light sensor may subdivide the region of interest into a plurality of sections, where each section includes a number of image pixels. For example, assuming the region of interest is the shape of a square, the visible light sensor may subdivide the square into numerous sub-squares. The number of sections a region of interest is subdivided into may be a function of a size or area of the region of interest as determined by the visible light sensor. At step 814, the visible light sensor may compute the luminance of each section. The visible light sensor may determine the luminance of each section by computing the luminance of each pixel (or a subset of pixels) that makes up a given section and then integrating or averaging these computed values into a single luminance value, which may be obtained as described previously.

Once having a computed luminance value for each section, the visible light sensor 180 may compare the luminance values of the sections at step 816 to determine whether one or more sections have computed luminance values that differ from one or more other sections by a threshold value (e.g., by a factor of four although other factors may be used). At step 818, the visible light sensor may determine whether one or more sections have differing luminance values. If so, the visible light sensor may communicate one or messages for causing the motorized window treatments to lower the window treatment fabric at step 820. The amount by which by the window treatment fabric is lowered may be a function of the number of sections determined to have differing luminance values. On the contrary, if one or more sections are determined to not have differing luminance values, the glare detection procedure 800 may end with visible light sensor not modifying the level of the window treatment fabric.

Figure 9:
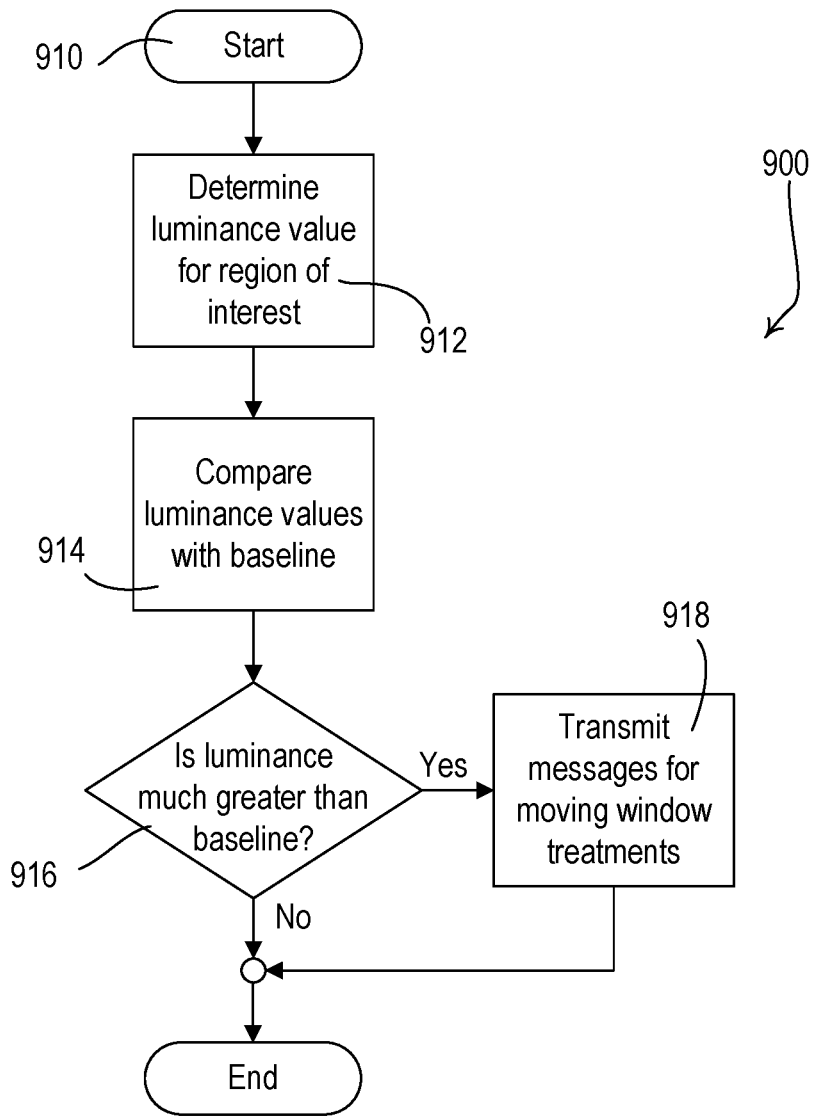

FIG. 9 is a flowchart of another example glare detection procedure 900, which may be executed by a control circuit of a visible light sensor (e.g., the control circuit 310 of the visible light sensor 300) to process a sensor event that includes detecting whether sunlight entering from a window (e.g., the window 104) may be shining on (e.g., producing glare on) all of or at least a portion of a region of interest and if glare is detected, to operate motorized window treatments (e.g., the motorized window treatments 150) to eliminate the glare. Again, as an example the region of interest may be defined to be a desk surface within a room (e.g., the region of interest 262 in the room 200 shown in FIG. 2E). According to this example, once obtaining the region of interest from a retrieved image by applying a mask for that region to the image, the visible light sensor may analyze the region of interest to determine whether a computed luminance value for the region of interest exceeds a baseline luminance value and if so, may determine that glare is present on at least a portion of the region.

The glare detection procedure 900 may start at step 910. At step 912, the visible light sensor may determine a luminance value for the region of interest by computing a luminance value for each image pixel making up the region of interest (e.g., as described above) and then integrating or averaging these computed values to obtain a single luminance value for the region of interest. At step 914, the visible light sensor may compare the computed luminance value for the region of interest to a baseline luminance value determined for the region of interest. At step 916, the visible light sensor may determine whether the computed luminance value exceeds the baseline luminance value by a threshold value (e.g., by a factor of four although other factors may be used). If the computed luminance value exceeds the baseline luminance value by the threshold value, at step 918 the visible light sensor may communicate one or messages to the motorized window treatments to lower the window treatment fabric. The amount by which by the window treatment fabric is lowered may be a function of the amount by which the computed luminance value exceeds the baseline luminance value. On the contrary, if the computed luminance value does not exceed the baseline luminance value by the threshold value, the glare detection procedure 900 may end with visible light sensor not modifying the level of the window treatment fabric.

Figure 10:
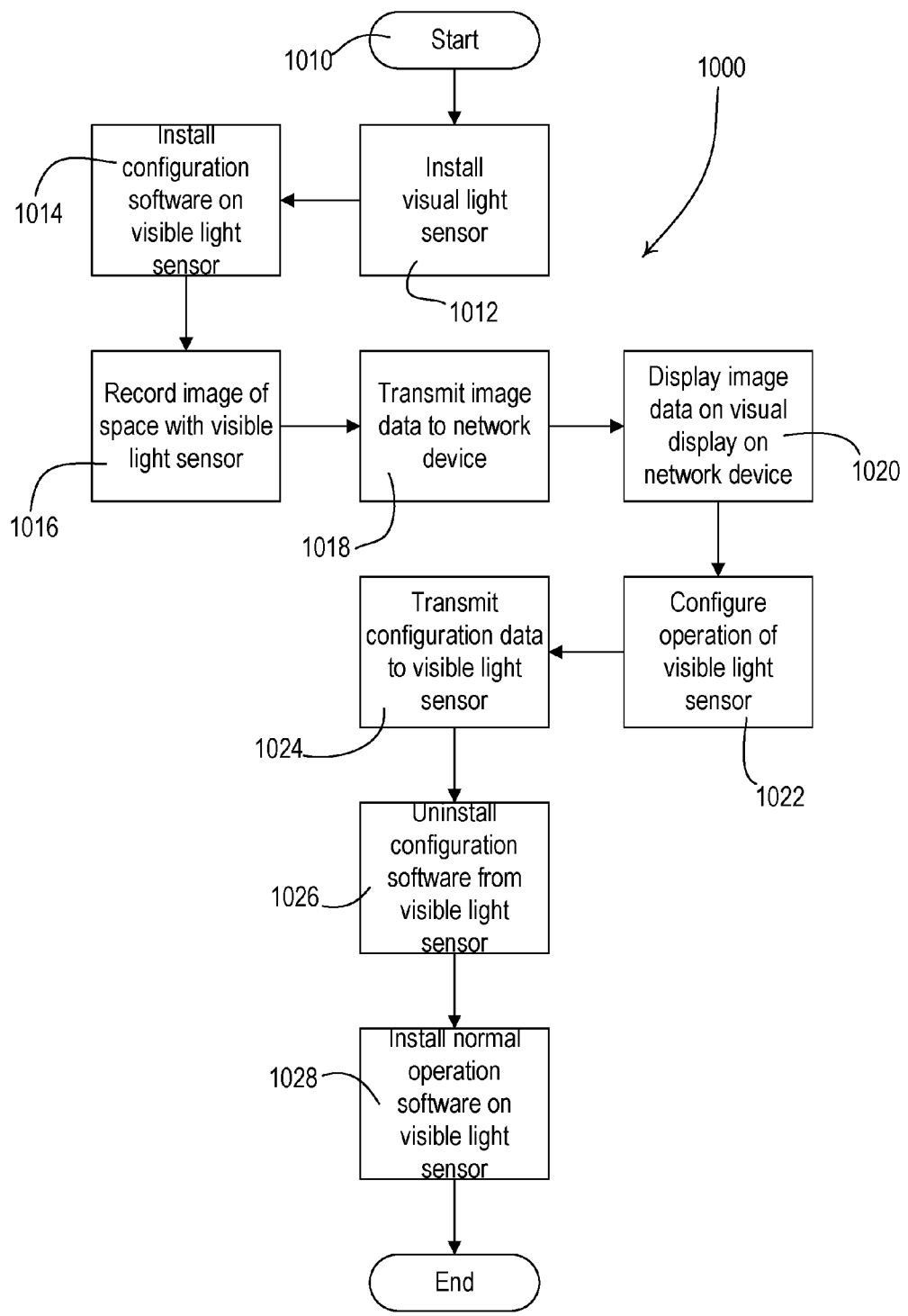
FIG. 10 shows a flowchart of an example configuration procedure for a visible light sensor using a special configuration software.

FIG. 10 shows a flowchart of an example configuration procedure 1000 for a visible light sensor (e.g., the visible light sensor 180 and/or the visible light sensor 300) using a special configuration software. The configuration software may be used in a way that protects the privacy of the users of a space (e.g., the room 102 and/or the room 200). The visible light sensor may be configured to transmit digital messages via a first communication link (e.g., a communication link using a proprietary protocol) during normal operation. The configuration procedure 1000 may begin at step 1010. At step 1012, the visible light sensor may be installed, for example, on a ceiling, a wall, and/or any other location in which it may be useful to install the visible light sensor. Configuration software may be installed on a visible light sensor at step 1014. The configuration software may allow the visible light sensor to transmit an image recorded by a camera (e.g., the camera 322) via a second communication link (e.g., a communication link using a standard protocol) during configuration of the visible light sensor. The configuration software may be installed in memory (e.g., the memory 312) during manufacturing, such that the visible light sensor is ready to be configured when powered after installation. The visible light sensor may also be configured to receive the configuration software via the second communication link) and the visible light sensor may store the configuration software in the memory during configuration of the visible light sensor.

At step 1018, the visible light sensor may transmit the image of the space, for example, to a network device (e.g., the network device 190) via the second communication link.

At step 1020, the transmitted image may be displayed, for example, on a graphical user interface (GUI) on a visual display of the network device. At step 1022, a user of the network device may configure the operation of the visible light sensor, for example, using the image received and displayed by the network device. At step 1024, the network device may transmit the configuration parameters to the visible light sensor. Configuration parameters may include, for example, desired sensor events, operational parameters for sensor events, digital masks and/or regions of interest for sensor events, baseline images and/or values, etc. The configuration parameters may be transmitted via the same, or different, protocol (e.g., the first communication link) that was used to transmit the image at step 1018.

At 1026, the configuration software may be uninstalled from the visible light sensor, for example, when configuration of the visible light sensor is complete. For example, when the configuration of the visible light sensor is complete, the visible light sensor may exit configuration mode and move to the normal operation mode of the visible light sensor for sensing environmental characteristics from the recorded images and transmitting messages for load control. At step 1028, normal operation software may be installed by the visible light sensor for use during normal operation of the visible light sensor. The normal operation software may be installed in the memory of the visible light sensor and/or may be received via the first or second communication links during configuration of the visible light sensor. The normal operation software may include the normal operation modes (e.g., the sensor modes) for sensing environmental characteristics from the recorded images and transmitting messages for load control.

Figure 11:
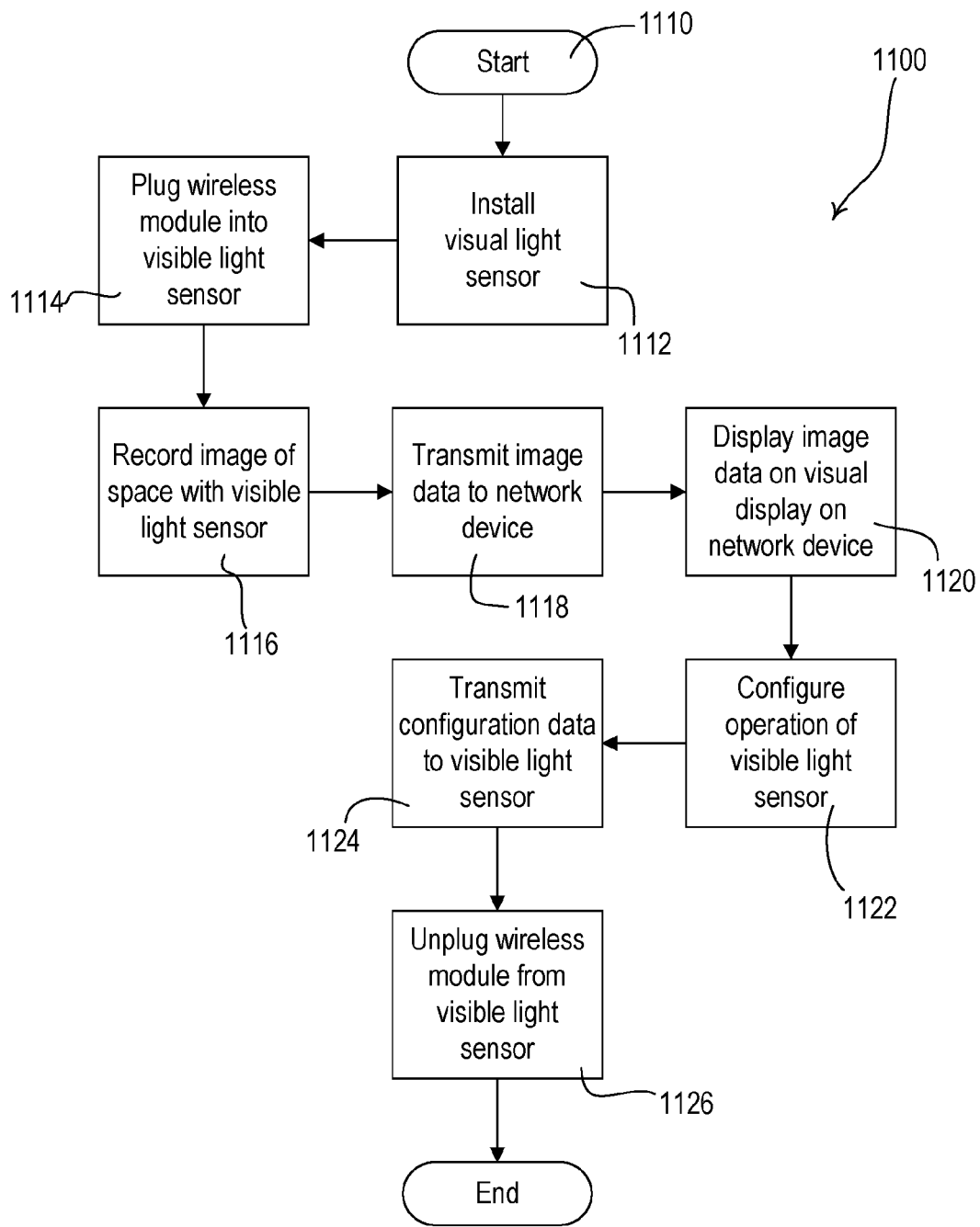
FIG. 11 shows a flowchart of an example configuration procedure for a visible light sensor using a removable configuration module.

FIG. 11 shows a flowchart of an example configuration procedure 1100 for a visible light sensor (e.g., the visible light sensor 180 and/or the visible light sensor 300) using a removable configuration module. The visible light sensor may be configured to transmit digital messages via a first communication link (e.g., a communication link using a proprietary protocol) during normal operation. During configuration of the visible light sensor, the configuration module may be coupled to (e.g., installed in) the visible light sensor. When the configuration module is installed in the visible light sensor, a control circuit (e.g., the control circuit 310) may transmit an image recorded by a camera (e.g., the camera 322) via a second communication link (e.g., a communication link using a standard protocol). The configuration module may be removed from the visible light sensor, resulting in the visible light sensor being unable to transmit images.

The configuration procedure 1100 may begin at step 1110. At 1112, the visible light sensor may be installed, for example, on a ceiling, a wall, and/or any other location in which it may be useful to install the visible light sensor. At 1114, a module may be coupled to the visible light sensor. The module may have one or both of wired and wireless capabilities (e.g., for transmitting wireless signal via the second communication link). When the configuration module is installed in the visible light sensor and the configuration module is electrically coupled to the visible light sensor, the visible light sensor may record an image of the space and transmit the image to a network device (e.g., the network device 190), for example, directly to the network device via the second communication link. As step 1120, the network device may display the image, for example, on a graphical user interface (GUI) on a visual display of the network device.

At 1122, a user of the network device may configure the operation of the visible light sensor, for example, using the image received and displayed by the network device. Configuration parameters may include, for example, desired sensor events, operational parameters for sensor events, digital masks and/or regions of interest for sensor events, baseline images and/or values, etc. At step 1124, the network device may transmit the configuration parameters to the visible light sensor while the configuration module is still installed in the visible light sensor, and the visible light sensor may store the configuration information in memory. After the configuration of the visible light sensor is complete, the configuration module may be removed from the visible light sensor at step 1126. With the configuration module removed, the visible light sensor may be unable to transmit images via the second communication link. The configuration module may remain disconnected from the visible light sensor during normal operation of the visible light sensor.

Figure 12:
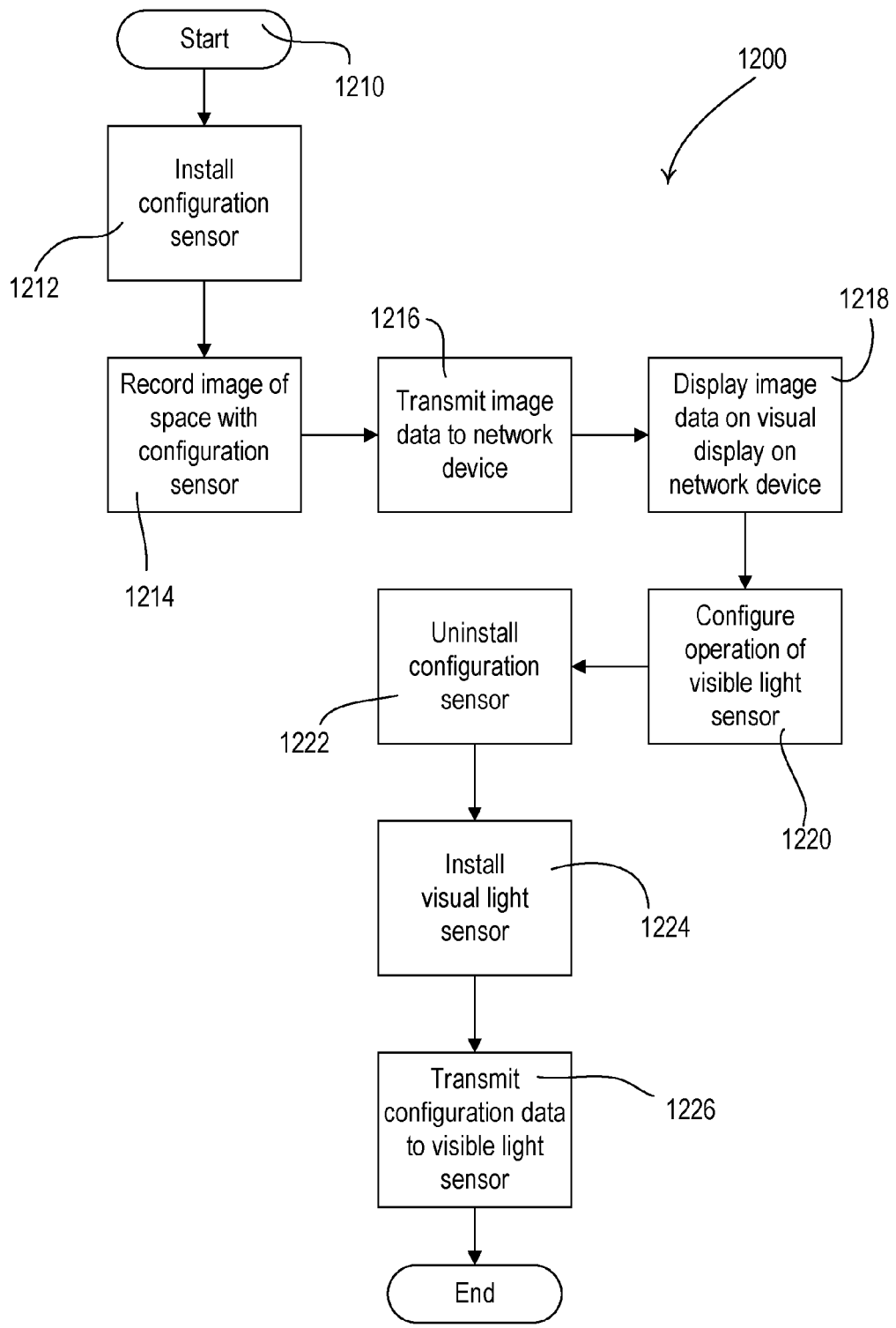
FIG. 12 shows a flowchart of an example configuration procedure for a visible light sensor using a special configuration sensor.

FIG. 12 shows a flowchart of an example configuration procedure 1200 for a visible light sensor (e.g., the visible light sensor 180 and/or the visible light sensor 300) using a special configuration sensor. The visible light sensor may be configured to transmit digital messages via a first communication link (e.g., a communication link using a proprietary protocol) during normal operation. The configuration sensor may have a structure that is identical, or similar, to the visible light sensor. However, the configuration sensor may be configured to transmit digital messages via a second communication link (e.g., a communication link using a standard protocol) during the configuration procedure. The configuration sensor may be configured to transmit images of the space via the second communication link.

The configuration procedure 1200 may begin at step 1210. At 1212, the configuration sensor may be installed, for example, in place of the visible light sensor. At step 1214, the configuration sensor may record an image of the space, for example, using a camera. At step 1216, the configuration sensor may transmit the image of the space, for example, to a network device (e.g., the network device 190) via the second communication link. At step 1218, the transmitted image may be displayed, for example, on a graphical user interface (GUI) on a visual display of the network device. At 1220, a user of the network device may configure the operation of the visible light sensor, for example, using the image received and displayed by the network device. Configuration parameters may include, for example, desired sensor events, operational parameters for sensor events, digital masks and/or regions of interest for sensor events, baseline images and/or values, etc.

At 1222, the configuration sensor may be uninstalled, for example, when configuration of the visible light sensor is complete. For example, the visible light sensor may exit the configuration mode and move to the normal operation mode of the visible light sensor when the configuration of the visible light sensor is complete. At step 1224, the visible light sensor (e.g., that is not configured to communication on the second communication link) may be installed in place of the configuration sensor. At step 1226, the network device may transmit the configuration parameters to the visible light sensor. For example, the visible light sensor may receive configuration information via the first communication link and may store the configuration information in memory.

What is claimed is:

1. A method of configuring a visible light sensor mounted in a space, the visible light sensor installed at a location at which the visible light sensor can record images of the space, the visible light sensor configured to transmit and receive first digital messages via a first communication link when executing operation software during operation, the method comprising:
- recording a first image of the space by the visible light sensor;
- executing a configuration software on the visible light sensor to transmit a digital representation of the first image to a network device in second digital messages via a second communication link;
- setting at least one configuration parameter of the visible light sensor at the network device using the digital representation of the first image;
- transmitting the at least one configuration parameter to the visible light sensor;
- subsequently installing the operation software in place of the configuration software, wherein the operation software is configured to operate according to the at least one configuration parameter, and wherein the operation software being installed in place of the configuration software prevents the visible light sensor from being able to transmit the images or digital representations of the images of the space in the second digital messages via the second communication link;
- recording a second image of the space during execution of the operation software on the visible light sensor;
- identifying an environmental characteristic in the second image of the space; and
- transmitting the first digital messages via the first communication link during execution of the operation software on the visible light sensor, wherein the first digital messages comprise an indication of an environmental characteristic on which an electrical load may be controlled or load control instructions for controlling the electrical load.

2. The method of claim 1, wherein the configuration software configures the visible light sensor to operate in a plurality of modes of operation during the execution of the operation software, wherein the plurality of modes of operation comprise at least one of a daylighting mode, a daylight glare mode, a color temperature mode, or an occupancy/vacancy mode.

3. The method of claim 2, wherein the configuration software configures the visible light sensor to alternate sequentially between the plurality of modes of operation after expiration of predefined periods of time during the execution of the operation software.

4. The method of claim 2, wherein the configuration software configures the visible light sensor to alternate between different modes of the plurality of modes of operation based on identification of different environmental characteristics in the first image.

5. The method of claim 2, wherein the at least one configuration parameter relates to a respective mode of the plurality of modes of operation.

6. The method of claim 1, wherein transmitting the at least one configuration parameter to the visible light sensor comprises transmitting the at least one configuration parameter to the visible light sensor via the first communication link or the second communication link.

7. A sensor mountable in a space, the sensor comprising:
- a visible light sensing circuit configured to record images of a space;
- a first communication circuit configured to transmit and receive first digital messages via a first communication link during operation;
- a second communication circuit configured to transmit and receive second digital messages via a second communication link during configuration; and
- a control circuit configured to:
  - execute a configuration software to transmit a digital representation of a first image to a network device via the second communication link;
  - receive at least one configuration parameter from the network device in response to the digital representation of the first image; and
  - subsequently install operation software in place of the configuration software, wherein the operation software is configured to operate according to the at least one configuration parameter, and wherein the operation software installed in place of the configuration software prevents the sensor from being able to transmit the images or digital representations of the images of the space in the second digital messages via the second communication link;
  - detect an environmental characteristic in a second image of the space during execution of the operation software; and
  - transmit the first digital messages via the first communication link during execution of the operation software, wherein the first digital messages comprise an indication of an environmental characteristic on which an electrical load may be controlled or load control instructions for controlling the electrical load.

8. The sensor of claim 7, wherein the configuration software is configured to enable the control circuit to operate in a plurality of modes of operation during the execution of the operation software, wherein the plurality of modes of operation comprise at least one of a daylighting mode, a daylight glare mode, a color temperature mode, or an occupancy/vacancy mode.

9. The sensor of claim 8, wherein the configuration software is configured to enable the control circuit to alternate sequentially between the plurality of modes of operation after expiration of predefined periods of time during the execution of the operation software.

10. The sensor of claim 8, wherein the configuration software is configured to enable the control circuit to alternate between different modes of the plurality of modes of operation based on identification of different environmental characteristics in the image.

11. The sensor of claim 8, wherein the at least one configuration parameter relates to a respective mode of the plurality of modes of operation.

12. The sensor of claim 7, wherein the control circuit is further configured to transmit the first digital messages via the first communication link during operation of the visible light sensor, wherein the first digital messages comprise load control instructions for controlling an electrical load.

13. The sensor of claim 7, wherein the control circuit is configured to receive the at least one configuration parameter via the first communication link or second communication link.

* * * * *